(12) United States Patent
Chowdhury

(10) Patent No.: US 12,030,265 B2
(45) Date of Patent: Jul. 9, 2024

(54) FORMING A CURVATURE INTO A CHARGE

(71) Applicant: The Boeing Company, Chicago, IL (US)

(72) Inventor: Nayeem Tawqir Chowdhury, Victoria (AU)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 17/654,027

(22) Filed: Mar. 8, 2022

(65) Prior Publication Data

US 2023/0286229 A1    Sep. 14, 2023

(51) Int. Cl.
*B29C 70/54* (2006.01)
*B29C 70/22* (2006.01)
*B29C 70/30* (2006.01)

(52) U.S. Cl.
CPC .......... *B29C 70/541* (2013.01); *B29C 70/222* (2013.01); *B29C 70/30* (2013.01); *B29C 70/545* (2013.01)

(58) Field of Classification Search
USPC ....................................................... 72/413
See application file for complete search history.

(56) References Cited

U.S. PATENT DOCUMENTS

| 5,151,277 A | 9/1992 | Bernardon et al. |
| 6,053,026 A | 4/2000 | Nardiello et al. |
| 9,561,602 B2 * | 2/2017 | Jones ............... B29C 45/80 |
| 10,538,451 B2 * | 1/2020 | Angel ............... C03B 23/0258 |
| 2003/0205334 A1 | 11/2003 | Sherrill et al. |
| 2008/0251975 A1 | 10/2008 | Gallagher et al. |
| 2010/0043511 A1 | 2/2010 | Forsyth |
| 2020/0331214 A1 | 10/2020 | Vlavianos et al. |
| 2020/0398459 A1 | 12/2020 | Madsen et al. |

FOREIGN PATENT DOCUMENTS

| GB | 2467784 A | * | 8/2010 | ........... B29C 51/087 |
| KR | 20160147801 A | * | 10/2016 | |
| WO | WO-2020178387 A1 | * | 9/2020 | ............. B29C 31/08 |

OTHER PUBLICATIONS

Intellectual Property Office of the United Kingdom Combined Search and Examination Report, dated Aug. 7, 2023, regarding Application No. GB2302684.2, 8 pages.

* cited by examiner

*Primary Examiner* — Barbara J Musser
(74) *Attorney, Agent, or Firm* — Yee & Associates, P.C.

(57) ABSTRACT

A method of forming a composite structure is presented. A charge is placed on a charge support surface of a charge forming table in a planar orientation, the charge support surface formed by a plurality of surfaces of a plurality of charge forming fingers. A number of charge forming fingers of the plurality of charge forming fingers is actuated to form a curvature into the charge. The charge having the curvature is removed from the charge forming table. The charge having the curvature is placed onto a tool having a matching surface curvature.

27 Claims, 19 Drawing Sheets

FORMING A CURVATURE INTO A CHARGE

BACKGROUND INFORMATION

1. Field

The present disclosure relates generally to composite manufacturing and more specifically to forming a curvature into a charge.

2. Background

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Composite structures can be fabricated by laying up a number of composite plies to form a charge. During hand layup, charges are laid up by hand over a tool, and the fabric may be swept by hand in order to reduce possible wrinkling and bridging of the material.

To reduce dependency on hand layup and increase manufacturing flow rate, automated techniques have been devised for controlled placement of flat charges onto flat tools. A curvature of a tool introduces complications to placement of charges on the tool.

Therefore, it would be desirable to have a method and apparatus that takes into account at least some of the issues discussed above, as well as other possible issues. Accordingly, there is a need for a method and apparatus for placing charges on curved tools.

SUMMARY

An embodiment of the present disclosure provides a method of forming a composite structure. A charge is placed on a charge support surface of a charge forming table in a planar orientation, the charge support surface formed by a plurality of surfaces of a plurality of charge forming fingers. A number of charge forming fingers of the plurality of charge forming fingers is actuated to form a curvature into the charge. The charge having the curvature is removed from the charge forming table. The charge having the curvature is placed onto a tool having a matching surface curvature.

Another embodiment of the present disclosure provides a method of forming a composite structure. A charge is placed on a charge support surface of a charge forming table in a planar orientation, the charge support surface formed by a plurality of surfaces of a plurality of charge forming fingers. A number of charge forming fingers and a second number of charge forming fingers of the plurality of charge forming fingers are actuated in a series of movements to change the charge support surface of the charge forming table from the planar orientation to a curved orientation such that a curvature is formed in the charge.

Yet another embodiment of the present disclosure provides a method of forming a composite structure. A surface curvature of a tool is received. Material information for a layup of a charge is received. A series of movements of a plurality of charge forming fingers of a charge support surface of a charge forming table is generated to form a curvature complimentary to the surface curvature of the tool into the charge based on the material information.

A yet further embodiment of the present disclosure provides a charge forming table. The charge forming table comprises a housing, and a plurality of charge forming fingers extensibly coupled to the housing and forming a charge support surface of the charge forming table. Each of the plurality of charge forming fingers is independently movable relative to the housing, movable along a spectrum of extended lengths, and comprises a respective surface forming a portion of the charge support surface.

Another embodiment of the present disclosure provides a locking mechanism for a charge forming table. The locking mechanism comprises a plurality of locks configured to lock each of a plurality of charge forming fingers at a respective desired extended length, each one of the plurality of locks associated with a respective one of the plurality of charge forming fingers, and the plurality of charge forming fingers extensibly coupled to a housing and forming a charge support surface of the charge forming table.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
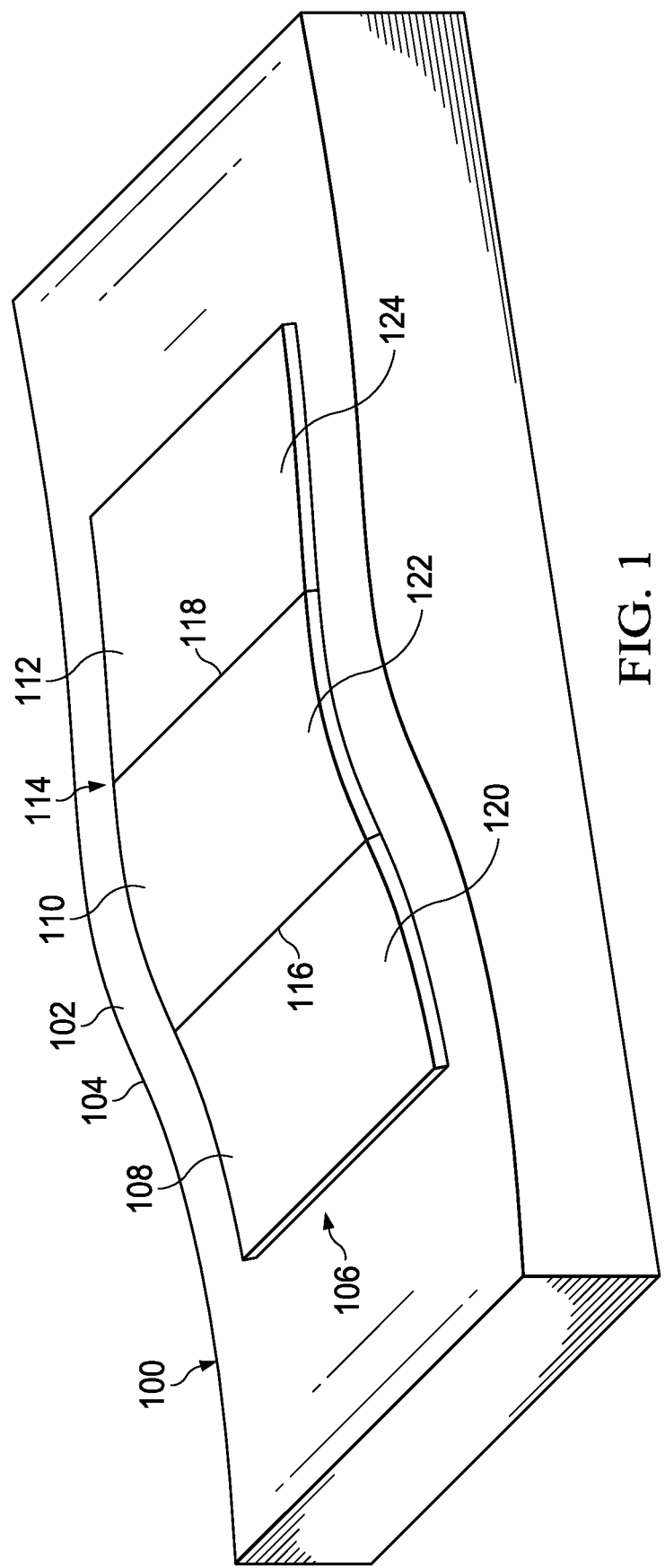
FIG. 1 is an illustration of a plurality of charges on a tool in accordance with an illustrative example.

The illustrative examples recognize and take into account one or more different considerations. The illustrative examples recognize and take into account that current methods for resin infusion can use 2D Pick and Place (2d PnP) where a flat ply is transferred to a flat tool.

The illustrative examples recognize and take into account that three-dimensional pick and place (3D PnP) is the process of placing flat plies cut from a roll of fabric (either Prepreg or Dry Fabric) onto a curved tool. When a tool has a curvature, the curvature complicates placement onto the tool due to deformation of the material being introduced to the process. In 3D PnP operations, the flat ply is lowered onto the curved tool surface, so that the highest point on the tool touches the suspended flat fabric first and then deformation of the material starts from that point. When a material is deformed across the surface curvature of the tool, deformation potentially traps in an inconsistency, such as a wrinkle, when the ply hits a trough.

The illustrative examples recognize and take into account that on curved tools, manual movement and alignment of ply boundaries, particularly at butt-splice regions, is currently performed. Experienced operators are capable of moving and aligning the ply boundaries to form a composite structure. When an operator performs this activity there is operator experience and expertise that is used to massage and/or move the plies into the correct location and ensure that splicing/alignment specifications are met.

The illustrative examples recognize and take into account that some 3D PnP tools use a set of either actuated or passive prongs suspended from a gantry/robot arm that pick up a 'cut' ply and then places it onto a curved tool. The illustrative examples recognize and take into account that when the ply is placed onto a curved tool difficulties can arise. The illustrative examples recognize and take into account that the trapping of wrinkles and mismatch on ply boundaries can occur. The illustrative examples recognize and take into account that in 3D PnP machines, the automated or passive prongs only push the material onto the curved tool in the vertical direction. The illustrative examples recognize and take into account that 3D PnP machines do not have an ability to observe or push out wrinkles as performed in a manual operation using operator input.

The illustrative examples recognize and take into account that three-dimensional pick and place is accomplished by a series of actuators. The illustrative examples recognize and take into account that each actuator connected to an end effector adds additional weight to the end effector. The illustrative examples recognize and take into account that some end effectors have weight limitations that could restrict the quantity of actuators that can be used on an end effector. The illustrative examples recognize and take into account that limiting a quantity of actuators can limit a resolution of deformation of the charge.

The illustrative examples recognize and take into account that three-dimensional pick and place operation is non-trivial due to considerations of avoiding wrinkles in the draping process while still maintaining splice gap conditions. The illustrative examples recognize and take into account that potential difficulties of movement and alignment of ply boundaries has been a consideration in automating three-dimensional pick and place (3D PnP) operations in Resin Infused (RI) structures. The illustrative examples recognize and take into account that there is no known 3D PnP operation currently used in production within the Resin Infusion production process to date.

The illustrative examples recognize and take into account that three-dimensional pick and place (3D PnP) may not provide a desired quality in a composite structure due to difficulties in forming ply boundaries. The illustrative examples recognize and take into account that complex shear and bending interaction of the fabric architecture brought about by warp and weft tows along with potential additions made to the dry material system, such as the veil, contribute to the difficulties in automatically aligning ply boundaries.

The illustrative embodiments provide a method and charge forming table that deform composite material prior to placement on a curved tool. The illustrative embodiments allow the composite material to be over deformed allowing for potential relaxation, and enables cutting of the number of edges to form ply boundaries after deformation of the charge, thus providing accurate edge definitions upon placement. Some of the illustrative embodiments avoid manual alignment of the ply boundaries by cutting at least one edge of the charge after the charge has been deformed. The illustrative embodiments overcome one of the biggest hurdles from going from a manual lay up to an automated activity.

An embodiment of the present disclosure provides a method of forming a composite structure. A charge is placed on a charge support surface of a charge forming table in a planar orientation, the charge support surface is formed by a plurality of surfaces of a plurality of charge forming fingers. A number of charge forming fingers of the plurality of charge forming fingers is actuated to form a curvature into the charge. The charge having the curvature is removed from the charge forming table. The charge having the curvature is placed onto a tool having a matching surface curvature.

Turning now to FIG. 1, an illustration of a plurality of charges on a tool is depicted in accordance with an illustrative embodiment. Tool 100 has surface 102 with surface curvature 104. Tool 100 is configured to receive charges 106. Charges 106 include charge 108, charge 110, and charge 112. In some illustrative examples, charges 106 can take the form of dry fiber charges prior to resin infusion. In some illustrative examples, charges 106 can take the form of prepreg composite material. After processing, such as curing or consolidating, charges 106 form a composite structure.

To form the composite structure, charge 108, charge 110, and charge 112 are placed onto surface 102. Each of charge 108, charge 110, and charge 112 is positioned on tool 100 to form joints 114. Charge 108 and charge 110 form joint 116. Charge 110 and charge 112 form joint 118.

To allow for automation of applying each of charge 108, charge 110, and charge 112 to surface 102 of tool 100, respective curvatures are introduced to each of charges 106 prior to applying the respective charge to tool 100. For example, curvature 120 is formed in charge 108 prior to application of charge 108 to tool 100. As another example, curvature 122 is formed in charge 110 prior to application of charge 110 to tool 100. As yet a further example, curvature 124 is formed in charge 112 prior to application of charge 112 to tool 100.

By charges 106 having respective curvatures prior to placement on tool 100, wrinkles or other inconsistencies can be avoided. Any of curvature 120, curvature 122, or curvature 124 can be introduced into a respective charge using a charge forming table, such as charge forming table 200 of FIG. 2 or charge forming table 300 of FIG. 3.

Figure 2:
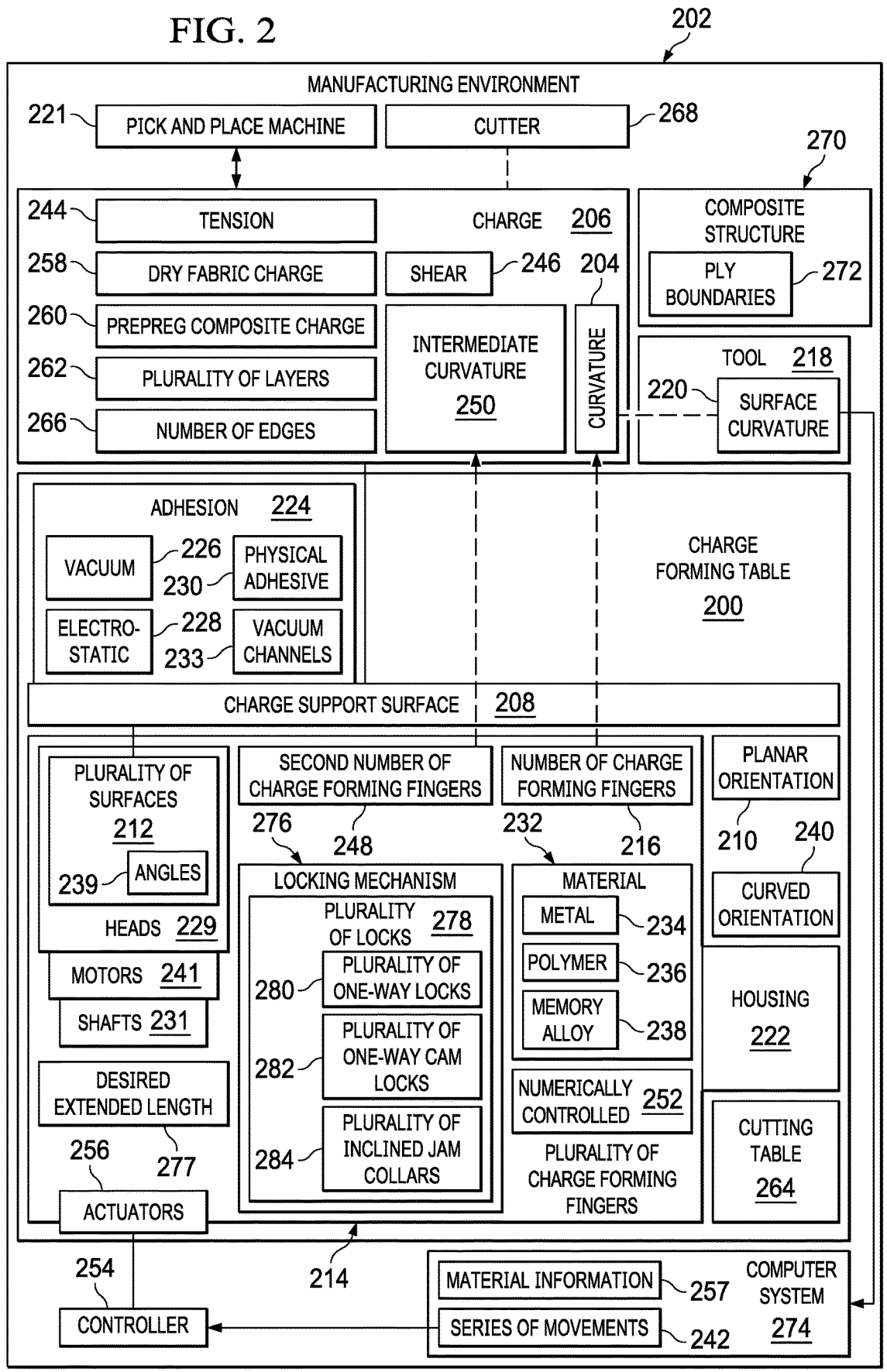
FIG. 2 is an illustration of a block diagram of a manufacturing environment with a charge forming table in accordance with an illustrative example.

Turning now to FIG. 2, an illustration of a block diagram of a manufacturing environment with a charge forming table is depicted in accordance with an illustrative embodiment. Charge forming table 200 in manufacturing environment 202 is used to form curvature 204 in charge 206. Charge forming table 200 in manufacturing environment 202 can be used to form a respective curvature into at least one charge of charges 106 prior to placement on tool 100 in FIG. 1.

To form curvature 204 in charge 206, charge 206 is placed onto charge support surface 208 of charge forming table 200 in planar orientation 210. Charge support surface 208 is formed by plurality of surfaces 212 of plurality of charge forming fingers 214.

Number of charge forming fingers 216 of plurality of charge forming fingers 214 is actuated to form curvature 204 into charge 206. Number of charge forming fingers 216 is a subset of plurality of charge forming fingers 214. As used herein, "a number of," when used with reference to items means one or more items. Number of charge forming fingers 216 is one or more charge forming fingers.

Charge 206 having curvature 204 is removed from charge forming table 200. Afterwards, charge 206 having curvature 204 is placed onto tool 218 having matching surface curvature 220. Surface curvature 220 is referred to as "matching" as surface curvature 220 is complimentary to curvature 204 of charge 206. When surface curvature 220 is "matching", charge 206 with curvature 204 is placed onto tool 218 with surface curvature 220 without further deformation of charge 206. Charge 206 is removed from charge forming table 200 and placed onto tool 218 using pick and place machine 221. Pick and place machine 221 takes the form of any desirable pick and place machine capable of maintaining curvature 204 in charge 206.

In some illustrative examples, pick and place machine 221 is placed into contact with charge 206 after charge 206 has curvature 204. In these illustrative examples, pick and place machine 221 forms curvature 204 into charge 206 prior to pick and place machine 221 contacting charge 206. In some other illustrative examples, pick and place machine 221 is placed into contact with charge 206 prior to charge 206 having curvature 204. In some illustrative examples, pick and place machine 221 is placed into contact with charge 206 when charge forming table 200 is in planar orientation 210. In some illustrative examples, pick and place machine 221 is placed into contact with charge 206 when charge has an intermediate curvature, such as intermediate curvature 250.

Charge forming table 200 comprises housing 222 and plurality of charge forming fingers 214 extensibly coupled to housing 222 and forming charge support surface 208 of charge forming table 200. Each of plurality of charge forming fingers 214 is independently movable relative to housing 222, movable along a spectrum of extended lengths, and comprising a respective surface forming a portion of charge support surface 208. Each respective surface is one of plurality of surfaces 212.

In some illustrative examples, at least one finger of plurality of charge forming fingers 214 has a desired form of adhesion 224. Adhesion 224 can take the form of vacuum 226, electro-static 228, physical adhesive 230, or any other desirable form of adhesion. In some illustrative examples, at least a subset of plurality of charge forming fingers 214 comprises vacuum channels 233 configured to apply vacuum 226 adhesion 224 between charge support surface 208 and charge 206. In some illustrative examples, physical adhesive 230 is applied to a respective surface of each of a subset of plurality of charge forming fingers 214.

Plurality of charge forming fingers 214 comprises heads 229 having plurality of surfaces 212. Heads 229 are attached to shafts 231. Plurality of charge forming fingers 214 are extensibly moved relative to housing 222 by moving shafts 231.

Plurality of charge forming fingers 214 is formed of material 232. Material 232 is any desirable material or combination of materials that can be placed in contact with charge 206 without undesirable interactions with charge 206. In some illustrative examples, material 232 is at least one of metal 234, polymer 236, or memory alloy 238. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required. In some illustrative examples, plurality of charge forming fingers 214 comprises memory alloy 238 such that a temperature applied to memory alloy 238 adjusts an angle of a respective surface of at least one of plurality of charge forming fingers 214.

In some illustrative examples, in addition to plurality of charge forming fingers 214 being extensible relative to housing 222, angles 239 of plurality of surfaces 212 are adjustable. In some illustrative examples, angles 239 are adjustable by plurality of charge forming fingers 214 being formed of memory alloy 238.

In some illustrative examples, motors 241 are optionally present between shafts 231 and heads 229. In some illustrative examples, angles 239 are adjustable by motors 241 in plurality of charge forming fingers 214.

At least some of plurality of charge forming fingers 214 are moved relative to housing 222 to move charge support surface 208 from planar orientation 210 to curved orientation 240. Curved orientation 240 is the orientation of charge support surface 208 when charge 206 on charge support surface 208 has curvature 204. Plurality of charge forming fingers 214 can be moved to form any desirable curvature in charge 206 depending upon surface curvature 220 of tool 218.

Series of movements 242 is implemented by charge forming table 200 to form curvature 204. Any desirable quantity of charge forming fingers of plurality of charge forming fingers 214 is moved in series of movements 242 to form curvature 204. Each movement of series of movements 242 is configured to reduce tension 244 and promote shear 246 in charge 206. Actuating number of charge forming fingers 216 and actuating second number of charge forming fingers 248 is performed to reduce tension 244 and promote shear 246 in charge 206.

In some illustrative examples, series of movements 242 is performed without any delay between the movements. In some illustrative examples, respective charge forming fingers of plurality of charge forming fingers 214 are moved continuously through series of movements 242. In some illustrative examples, series of movements 242 is performed with delays between at least two sets of movements in series of movements 242.

Plurality of charge forming fingers 214 can be moved in any desirable quantity of subsets. As depicted, plurality of charge forming fingers 214 comprises number of charge forming fingers 216 and second number of charge forming fingers 248 to perform series of movements 242 to form curvature 204 in charge 206. Second number of charge forming fingers 248 is moved to form intermediate curvature 250 in charge 206. Afterwards, number of charge forming fingers 216 is moved to form curvature 204 in charge 206.

Although only two subsets of plurality of charge forming fingers 214, number of charge forming fingers 216 and second number of charge forming fingers 248, are depicted for ease of explanation, any desirable quantity of subsets of plurality of charge forming fingers 214 can be moved to form curvature 204 in charge 206. In some illustrative examples, more than two subsets of plurality of charge forming fingers 214 is moved in series of movements 242.

Number of charge forming fingers 216 includes one or more charge forming fingers. Number of charge forming fingers 216 includes any desirable quantity of charge forming fingers. Second number of charge forming fingers 248 includes one or more charge forming fingers. Second number of charge forming fingers 248 includes any desirable quantity of charge forming fingers. In some illustrative examples, number of charge forming fingers 216 and second number of charge forming fingers 248 have at least one charge forming finger in common. In some illustrative examples, number of charge forming fingers 216 and second number of charge forming fingers 248 have no common charge forming fingers.

Plurality of charge forming fingers 214 is moved in any desirable fashion. In some illustrative examples, plurality of charge forming fingers 214 is numerically controlled 252 by controller 254. In some illustrative examples, plurality of charge forming fingers 214 of charge forming table 200 is not individually controlled by controller 254. In some illustrative examples, there can be a running slider underneath charge forming table 200 that pushes shafts 231 such that each of plurality of charge forming fingers 214 on charge forming table 200 reaches desired extended length 277. In some illustrative examples, desired extended length 277 can be referred to as a nominated height.

Charge forming table 200 and charge support surface 208 are designed to incorporate several zones that can be actuated up and down from planar orientation 210 to any desirable curvature. The z-motion of charge support surface 208 extends to a range of motion that suits surface curvature 220 of tool 218. Charge forming table 200 can be used for multiple tool shapes by programming actuators 256 to move plurality of charge forming fingers 214 to their desired z-positions. Actuation of plurality of charge forming fingers 214 does not limit the deformation of charge 206 to a consecutive deformation. Subsets of plurality of charge forming fingers 214 in different locations of charge forming table 200 can be moved to follow a desired deformation strategy to make use of the tendency of charge 206 to shear better in certain directions. The desired strategy takes into account material information 257 of charge 206.

The desired strategy includes series of movements 242 configured to reduce tension 244 and promote shear 246 in charge 206. Series of movements 242 are configured based on material information 257 and taking into account desired shear 246 in charge 206. Material information 257 includes types of fibers in charge 206, types of resin in charge 206 (if present), directions of fibers in charge 206, shapes of plurality of layers 262, and an order (layup) of plurality of layers 262 in charge 206.

Charge 206 deformed by charge forming table 200 can take the form of dry fabric charge 258 or prepreg composite charge 260. When charge 206 is dry fabric charge 258, curvature 204 is formed in charge 206 by charge forming table 200 prior to resin infusion. In these illustrative examples, dry fabric charge 258 with curvature 204 undergoes resin infusion while dry fabric charge 258 with curvature 204 is on surface curvature 220 of tool 218. When charge 206 is prepreg composite charge 260, resin is already present in charge 206 prior to forming curvature 204 into charge 206 by charge forming table 200.

Charge 206 comprises plurality of layers 262. When charge 206 takes the form of dry fabric charge 258, plurality of layers 262 comprises multiple layers of dry fabric. When charge 206 takes the form of prepreg composite charge 260, plurality of layers 262 comprises multiple layers of resin and fibers.

In some illustrative examples, placing charge 206 on charge support surface 208 comprises laying up plurality of layers 262 sequentially onto charge support surface 208 to form charge 206. In some illustrative examples, placing charge 206 on charge support surface 208 comprises placing charge 206 comprising plurality of layers 262 onto charge support surface 208. In these illustrative examples, charge 206 is laid up on a separate layup table and is transferred to charge forming table 200.

In some illustrative examples, charge 206 has number of edges 266 that are trimmed prior to placement of charge 206 on charge forming table 200. In some illustrative examples, charge 206 is trimmed on charge forming table 200. In these illustrative examples, charge forming table 200 takes the form of cutting table 264. Charge forming table 200 can be referred to as cutting table 264.

Charge 206 has number of edges 266. In some illustrative examples, charge 206 is cut prior to deformation to form curvature 204. In these illustrative examples, number of edges 266 is cut when charge 206 is flat. In some illustrative examples, number of edges 266 is cut when charge 206 is on charge forming table 200 in planar orientation 210. In some illustrative examples, charge 206 is trimmed the on charge forming table 200 prior to actuating number of charge forming fingers 216. In some of these illustrative examples, charge 206 has an intermediate curvature, such as intermediate curvature 250 when charge 206 is trimmed.

In some illustrative examples, charge 206 is cut after curvature 204 is formed in charge 206. In these illustrative examples, number of edges 266 is cut while charge 206 is supported by charge support surface 208. In these illustrative examples, charge 206 having curvature 204 is trimmed prior to removing charge 206 having curvature 204 from charge forming table 200.

When charge 206 with curvature 204 is trimmed on charge forming table 200, cutter 268 trimming charge 206 is referred to as a three-dimensional cutter. Cutter 268 is maneuvered in three axes to trim charge 206 with curvature 204.

After curvature 204 is formed into charge 206, charge 206 is removed from charge forming table 200 and placed onto tool 218 using pick and place machine 221. Charge 206 is cured on tool 218 to form composite structure 270. In some illustrative examples, composite structure 270 comprises additional charges.

Formation of curvature 204 in charge 206 by charge forming table 200 enables alignment of ply boundaries 272 in composite structure 270. Formation of curvature 204 in charge 206 reduces or eliminates wrinkles in ply boundaries 272 in composite structure 270. Placement of charge 206 with curvature 204 on surface curvature 220 of tool 218 improves accuracy of placement of charge 206. Introduction of curvature 204 into charge 206 by charge forming table 200 enables automation of manufacturing composite structure 270. Introduction of curvature 204 into charge 206 by charge forming table 200 enables automation of placement of charge 206 onto tool 218 having surface curvature 220.

In some illustrative examples, charge forming table 200 comprises locking mechanism 276 configured to lock each of plurality of charge forming fingers 214 at respective desired extended length 277. Desired extended length 277 is a respective length for each of plurality of charge forming fingers 214 based on a desired shape for charge forming table 200. Desired extended length 277 is a set length based on curvature 204. If curvature 204 is changed, desired extended length 277 for any of plurality of charge forming fingers 214 can change to achieve curvature 204. In some illustrative examples, locking mechanism 276 is part of actuators 256. In some illustrative examples, locking mechanism 276 is separate from actuators 256. In some illustrative examples, locking mechanism 276 comprises a number of one way passive locking mechanisms. In some illustrative examples, locking mechanism 276 is integrated into plurality of charge forming fingers 214.

In some illustrative examples, locking mechanism 276 for charge forming table 200 comprises plurality of locks 278 configured to lock each of a plurality of charge forming fingers 214 at a respective desired extended length 277, each one of the plurality of locks 278 associated with a respective one of the plurality of charge forming fingers 214, and the plurality of charge forming fingers 214 extensibly coupled to a housing 222 and forming charge support surface 208 of charge forming table 200.

In some illustrative examples, locking mechanism 276 can comprise one direction lock style mechanisms. In some illustrative examples, plurality of locks 278 comprises plurality of one-way locks 280.

In some illustrative examples, plurality of one-way locks 280 comprises plurality of one-way cam locks 282. In some illustrative examples, locking mechanism 276 takes the form of plurality of one-way cam locks 282. A one-way cam lock of plurality of one-way cam locks 282 allows a shaft of a respective charge forming finger to move through in one direction when force is applied. A respective one-way cam lock of plurality of one-way cam locks 282 discourages the shaft of shafts 231 from moving in the opposite direction unless the respective one-way cam lock is disengaged. In some illustrative examples, each of plurality of one-way cam locks 282 comprises a ball in an internal incline that can become restrained, discouraging or preventing backwards movement.

In some illustrative examples, plurality of one-way locks 280 comprises plurality of inclined jam collars 284. In some illustrative examples, locking mechanism 276 takes the form of plurality of inclined jam collars 284. In some illustrative examples, each of plurality of inclined jam collars 284 comprises an incline that can be pushed up to allow movement of the shaft in an allowed direction. An incline of plurality of inclined jam collars 284 can be locked and discourage the respective shaft from movement in an opposite, disallowed direction. The incline is locked by releasing the incline and allowing the incline to drop downward and contact a collar. When the incline contacts the collar, the respective shaft is discouraged from movement in the disallowed direction. The respective inclined jam collar can be disengaged from the shaft to allow for movement of the respective shaft in the disallowed direction.

Locking mechanism 276 can restrict movement of each of plurality of charge forming fingers 214 due to gravity, springs, or other force pulling plurality of charge forming fingers 214 towards a neutral position. Locking mechanism 276 is engaged to maintain each of plurality of charge forming fingers 214 at desired extended length 277.

The illustration of charge forming table 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, in some illustrative examples, charge forming table 200 is not used as cutting table 264. As another example, although only number of charge forming fingers 216 and second number of charge forming fingers 248 are depicted, any desirable quantity of subsets of plurality of charge forming fingers 214 is moved in series of movements 242. In some illustrative examples, more than two subsets of plurality of charge forming fingers 214 is moved in series of movements 242.

Further, the use of terms "first" or "second" does not denote an order of movement of the subsets of plurality of charge forming fingers 214. For example, as described, second number of charge forming fingers 248 is moved prior to number of charge forming fingers 216. In some illustrative examples, second number of charge forming fingers 248 is a subset moved immediately prior to moving number of charge forming fingers 216. In some illustrative examples, additional subsets of plurality of charge forming fingers 214 are moved between movements of second number of charge forming fingers 248 and number of charge forming fingers 216.

Yet further, in some illustrative examples, pick and place machine 221 sandwiches charge 206 between charge support surface 208 of charge forming table 200 and pick and place machine 221. In some of these illustrative examples, adhesion 224 can be reduced or eliminated. In some of these illustrative examples, charge support surface 208 of charge forming table 200 changes the shape of charge 206 by moving respective charge forming fingers of plurality of charge forming fingers 214 towards pick and place machine 221. In some of these illustrative examples, the plurality of charge forming fingers 214 press themselves against pick and place machine 221 while components of pick and place machine 221 passively move wherever a charge forming finger of plurality of charge forming fingers 214 moves. In some illustrative examples, plurality of charge forming fingers 214 applies positive pressure against charge 206. In some illustrative examples, positive pressure applied by plurality of charge forming fingers 214 to charge 206 between charge forming table 200 and pick and place machine 221 can partially or completely replace adhesion 224.

Figure 3:
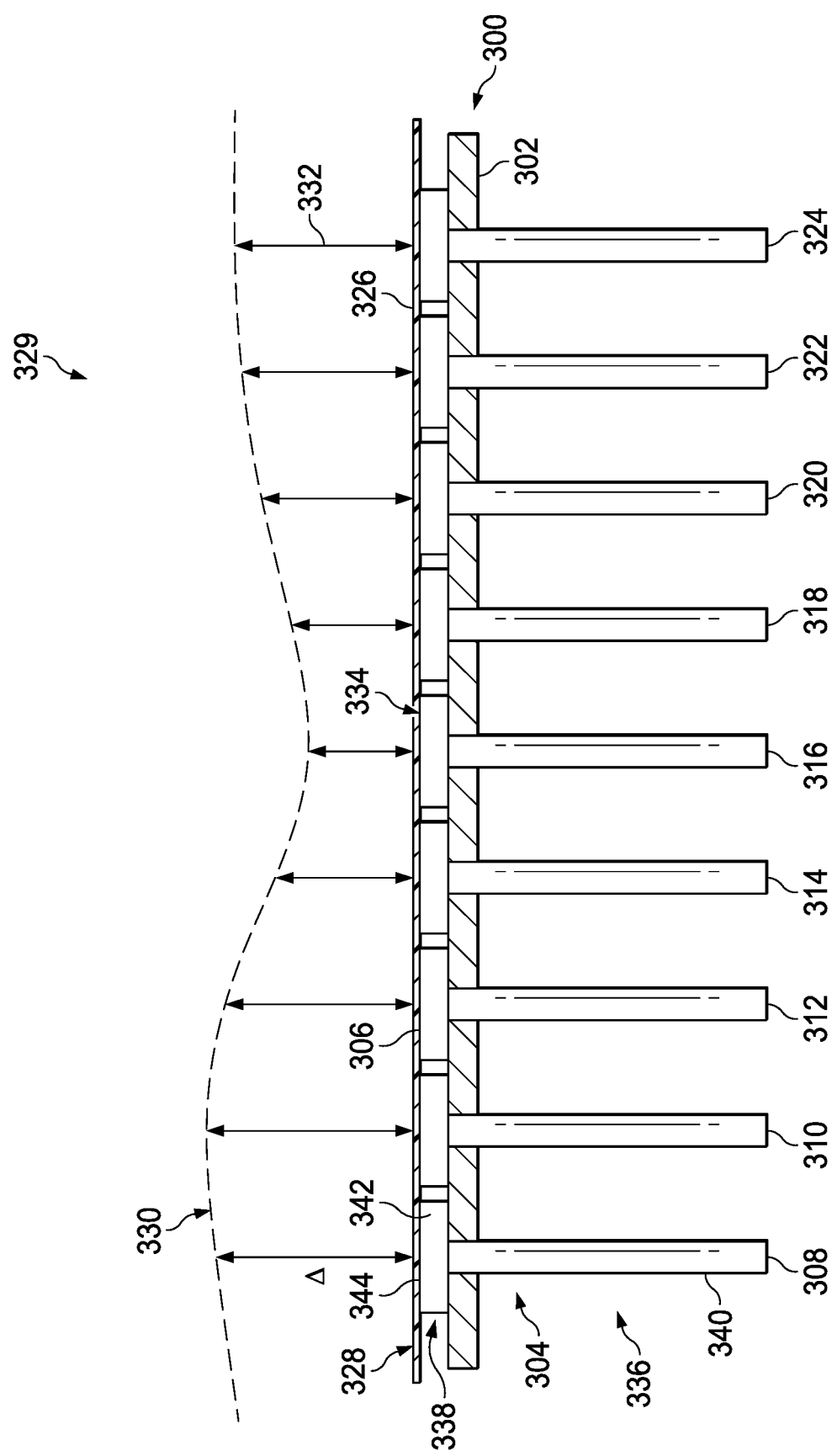
FIG. 3 is an illustration of a cross-sectional view of a charge on a charge forming table in accordance with an illustrative example.

Turning now to FIG. 3, an illustration of a cross-sectional view of a charge on a charge forming table is depicted in accordance with an illustrative embodiment. Charge forming table 300 is a physical implementation of charge forming table 200 of FIG. 2. Charge forming table 300 can be used to form a respective curvature into at least one charge of charges 106 prior to placement on tool 100 of FIG. 1. Charge forming table 300 comprises housing 302 and plurality of charge forming fingers 304 extensibly coupled to housing 302 and forming charge support surface 306 of charge forming table 300. Each charge forming finger of plurality of charge forming fingers 304 is independently movable relative to housing 302, movable along a spectrum of extended lengths, and comprises a respective surface forming a portion of charge support surface 306. As depicted, there are spaces between each respective surface of plurality of charge forming fingers 304. As a result, charge support surface 306 is not a continuous, uninterrupted surface.

In this illustrative example, plurality of charge forming fingers 304 comprises charge forming finger 308, charge forming finger 310, charge forming finger 312, charge forming finger 314, charge forming finger 316, charge forming finger 318, charge forming finger 320, charge forming finger 322, and charge forming finger 324. Charge 326 is positioned on charge support surface 306 formed by plurality of charge forming fingers 304. As depicted, charge forming table 300 is in planar orientation 328.

Charge 326 can be a dry charge or a prepreg composite charge. Charge 326 comprises a plurality of layers. In some illustrative examples, charge 326 is placed onto charge support surface 306 by laying up the plurality of layers sequentially onto charge support surface 306. In some illustrative examples, charge 326 is placed onto charge support surface 306 by placing charge 326 comprising the plurality of layers onto charge support surface 306.

In view 329 surface curvature 330 of a tool is depicted. In view 329, differences 332 between planar orientation 328 and surface curvature 330 are depicted.

Prior to generating a curvature in charge 326, surface curvature 330 of the tool is received by a processor. Material information for the layup of charge 326 is also received by the processor. The processor generates a series of movements of plurality of charge forming fingers 304 of charge support surface 306 of charge forming table 300 to form a curvature complimentary to surface curvature 330 of the tool into charge 326 based on the material information.

Charge support surface 306 of charge forming table 300 is formed by plurality of surfaces 334 of plurality of charge forming fingers 304. Plurality of charge forming fingers 304 include shafts 336 and heads 338 with plurality of surfaces 334. For example, charge forming finger 308 has shaft 340 and head 342 with surface 344. Shaft 340 is one of shafts 336. Head 342 is one of heads 338. Surface 344 is one of plurality of surfaces 334 forming charge support surface 306.

FIGS. 4-10 below depict one non-limiting example of a simplified series of movements of plurality of charge forming fingers 304 of FIG. 3.

Figure 4:
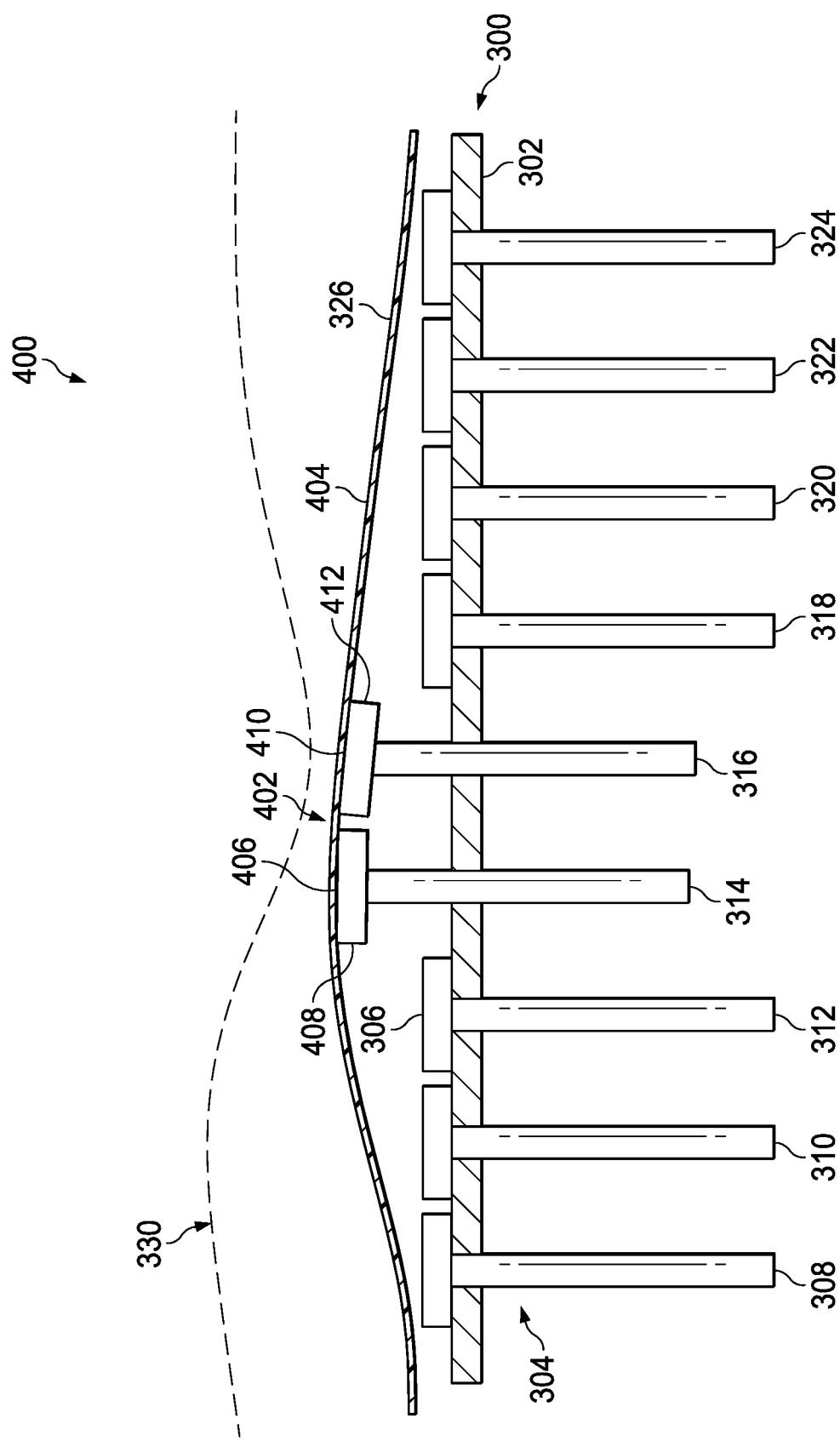
FIG. 4 is an illustration of a cross-sectional view of a charge on a charge forming table in accordance with an illustrative example.

Turning now to FIG. 4, an illustration of a cross-sectional view of a charge on a charge forming table is depicted in accordance with an illustrative embodiment. In view 400, charge forming finger 314 and charge forming finger 316 have extended relative to housing 302. Charge forming finger 314 and charge forming finger 316 are subset 402 of plurality of charge forming fingers 304. As used herein, "a subset of," when used with reference to items means one or more items of a group. For example, subset 402 is two charge forming fingers of plurality of charge forming fingers 304.

In some illustrative examples, a "subset" of plurality of charge forming fingers 304 can be described as a "number of" charge forming features. As used herein, "a number of," when used with reference to items means one or more items.

By extending subset 402, charge 326 is moved into intermediate curvature 404. Subset 402 is moved as one of a series of movements configured to control the stresses and strains in charge 326.

Subset 402 is moved by actuating charge forming finger 314 and charge forming finger 316. Actuating charge forming finger 314 lifts surface 406 of head 408 of charge forming finger 314 relative to housing 302. Actuating charge forming finger 316 lifts surface 410 of head 412 of charge forming finger 316 relative to housing 302.

Figure 5:
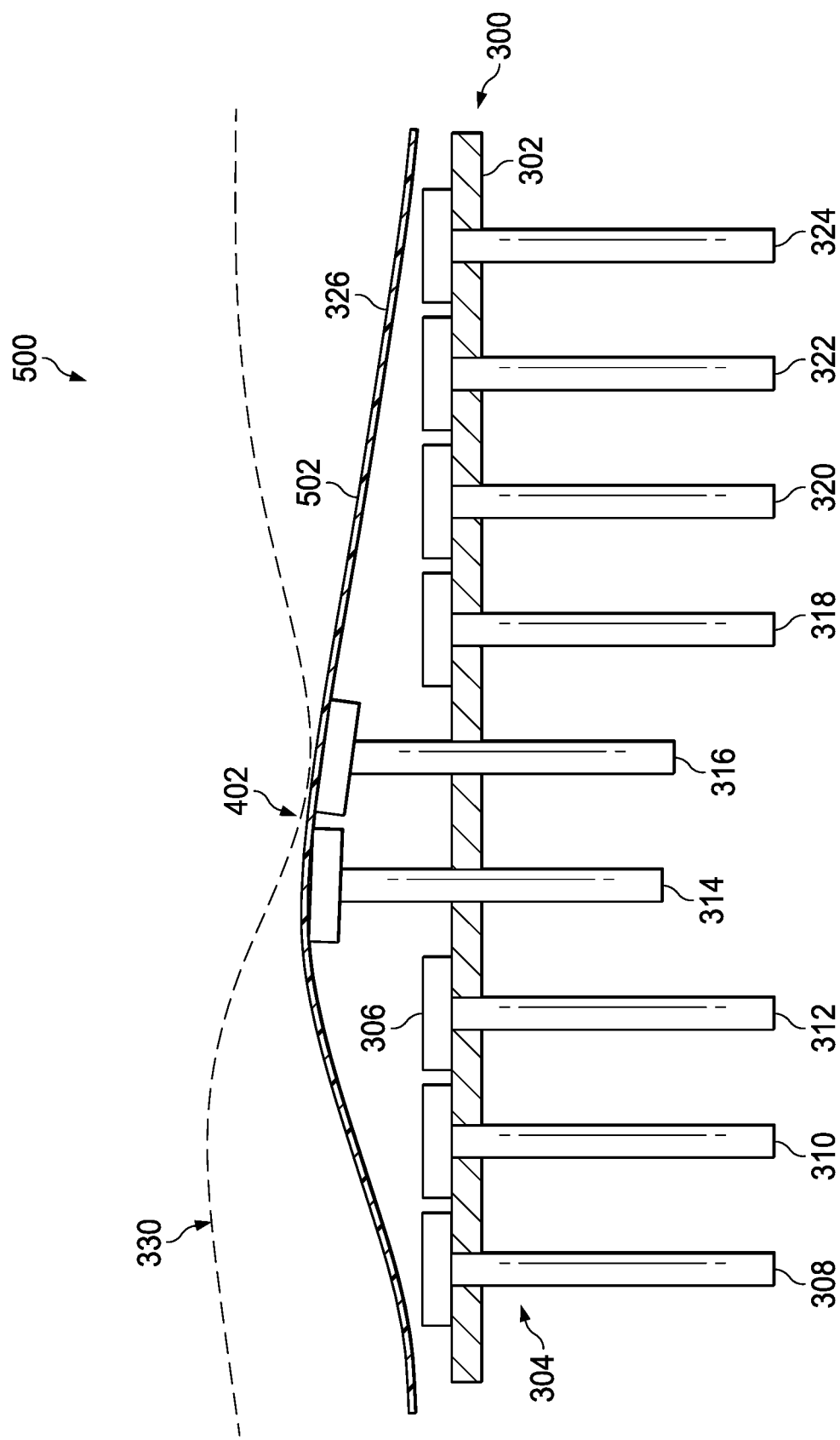
FIG. 5 is an illustration of a cross-sectional view of a charge on a charge forming table in accordance with an illustrative example.

Turning now to FIG. 5 is an illustration of a cross-sectional view of a charge on a charge forming table is depicted in accordance with an illustrative embodiment. In view 500, charge forming finger 314 and charge forming finger 316 have further extended relative to housing 302. By further extending subset 402, charge 326 is moved into intermediate curvature 502. In some illustrative examples, subset 402 is second number of charge forming fingers 248 of FIG. 2 and intermediate curvature 502 is intermediate curvature 250 of FIG. 2.

Subset 402 is moved as one of a series of movements configured to control the stresses and strains in charge 326. In some illustrative examples, view 400 of FIG. 4 and view 500 have a pause between intermediate curvature 404 of FIG. 4 and intermediate curvature 502. In some illustrative examples, there is no delay between view 400 and view 500 and movement between FIG. 3 and FIG. 5 is uninterrupted.

Figure 6:
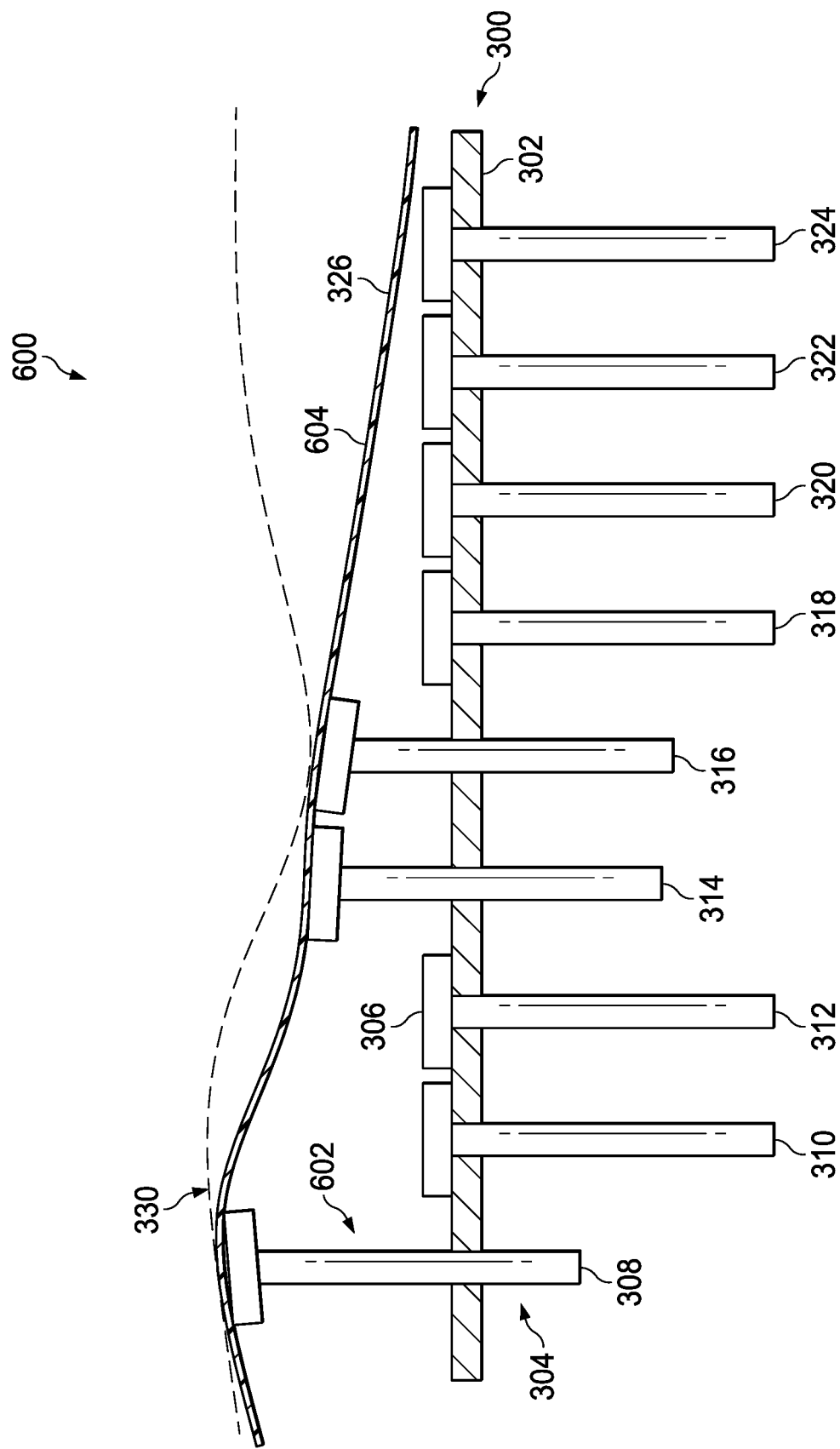
FIG. 6 is an illustration of a cross-sectional view of a charge on a charge forming table in accordance with an illustrative example.

Turning now to FIG. 6, an illustration of a cross-sectional view of a charge on a charge forming table is depicted in accordance with an illustrative embodiment. In view 600, charge forming finger 308 has been extended relative to housing 302. Charge forming finger 308 is subset 602 of plurality of charge forming fingers 304. By extending subset 602, charge 326 is moved into intermediate curvature 604. In some illustrative examples, subset 602 is second number of charge forming fingers 248 of FIG. 2 and intermediate curvature 604 is intermediate curvature 250 of FIG. 2. Movement of charge forming finger 308 and the other movements in the series of movements are each configured to reduce tension and promote shear in charge 326.

Figure 7:
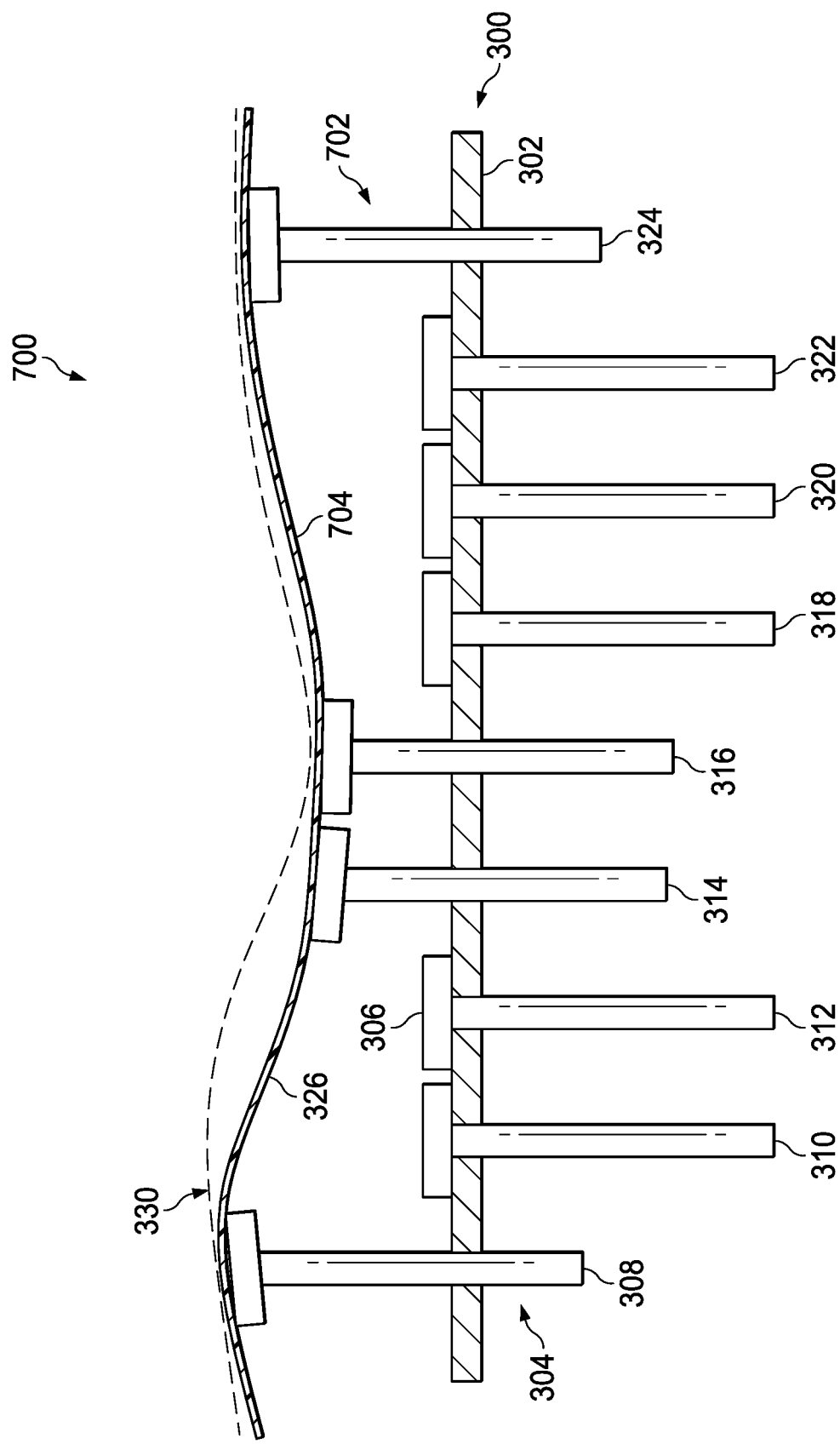
FIG. 7 is an illustration of a cross-sectional view of a charge on a charge forming table in accordance with an illustrative example.

Turning now to FIG. 7, an illustration of a cross-sectional view of a charge on a charge forming table is depicted in accordance with an illustrative embodiment. In view 700, charge forming finger 324 has been extended relative to housing 302. Charge forming finger 324 is subset 702 of plurality of charge forming fingers 304. By extending subset 702, charge 326 is moved into intermediate curvature 704. In some illustrative examples, subset 702 is second number of charge forming fingers 248 of FIG. 2 and intermediate curvature 704 is intermediate curvature 250 of FIG. 2. Movement of charge forming finger 324 and the other movements in the series of movements are each configured to reduce tension and promote shear in charge 326.

Figure 8:
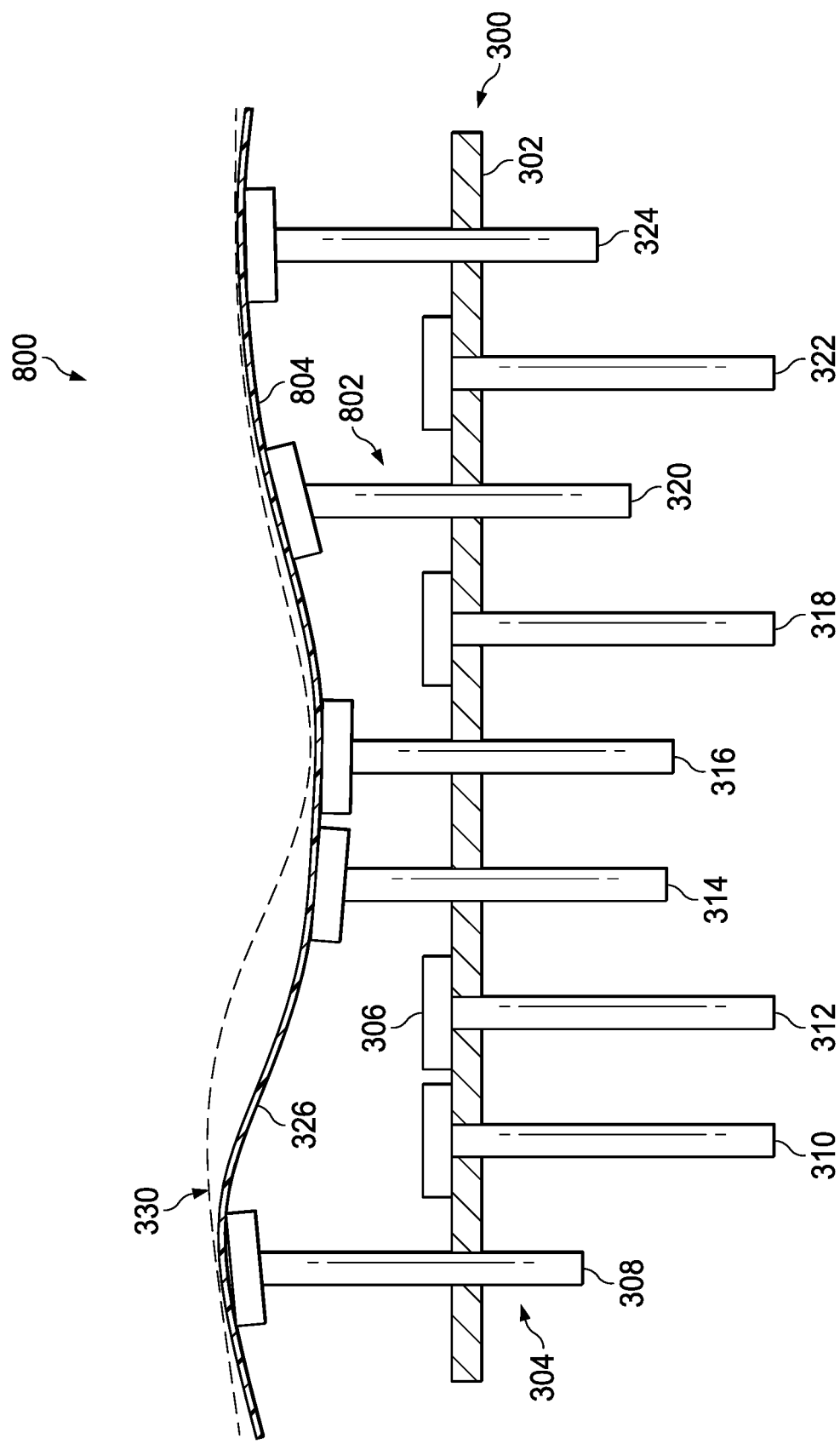
FIG. 8 is an illustration of a cross-sectional view of a charge on a charge forming table in accordance with an illustrative example.

Turning now to FIG. 8, an illustration of a cross-sectional view of a charge on a charge forming table is depicted in accordance with an illustrative embodiment. In view 800, charge forming finger 320 has been extended relative to housing 302. Charge forming finger 320 is subset 802 of plurality of charge forming fingers 304. By extending subset 802, charge 326 is moved into intermediate curvature 804. In some illustrative examples, subset 802 is second number of charge forming fingers 248 of FIG. 2 and intermediate curvature 804 is intermediate curvature 250 of FIG. 2. Movement of charge forming finger 320 and the other movements in the series of movements are each configured to reduce tension and promote shear in charge 326.

Figure 9:
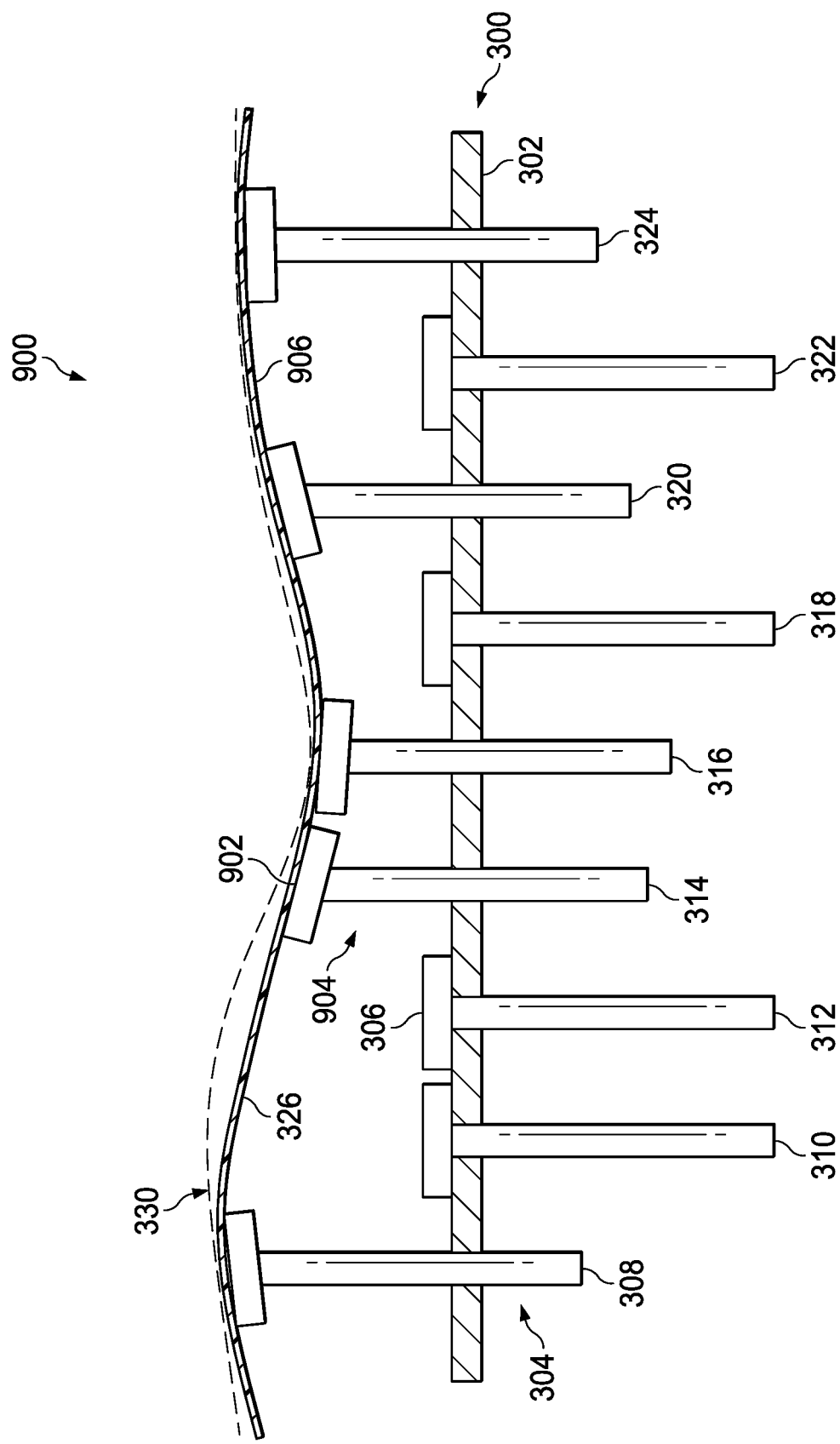
FIG. 9 is an illustration of a cross-sectional view of a charge on a charge forming table in accordance with an illustrative example.

Turning now to FIG. 9, an illustration of a cross-sectional view of a charge on a charge forming table is depicted in accordance with an illustrative embodiment. In view 900, charge forming finger 314 has been moved relative to housing 302. In this illustrative example, an angle of surface 902 of charge forming finger 314 has been changed relative to housing 302. Charge forming finger 314 is subset 904 of plurality of charge forming fingers 304. By extending subset 904, charge 326 is moved into intermediate curvature 906. In some illustrative examples, subset 904 is second number of charge forming fingers 248 of FIG. 2 and intermediate curvature 906 is intermediate curvature 250 of FIG. 2. Movement of charge forming finger 314 and the other movements in the series of movements are each configured to reduce tension and promote shear in charge 326.

In some illustrative examples, surface 902 is moved by a motor. In some illustrative examples, surface 902 is moved relative to housing 302 due to a memory material forming surface 902 and an applied temperature.

Figure 10:
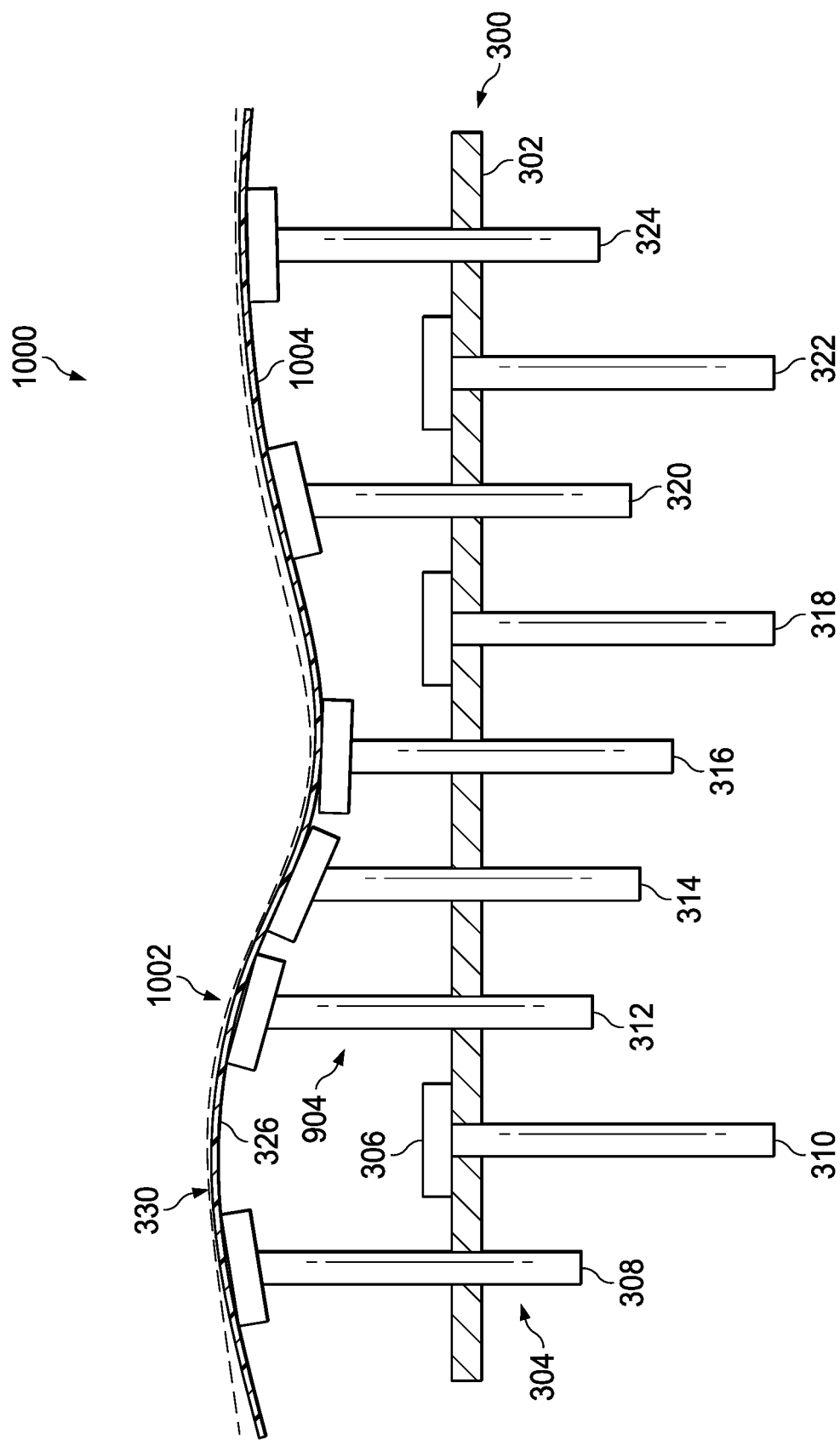
FIG. 10 is an illustration of a cross-sectional view of a charge on a charge forming table in accordance with an illustrative example.

Turning now to FIG. 10, an illustration of a cross-sectional view of a charge on a charge forming table is depicted in accordance with an illustrative embodiment. In view 1000, charge forming finger 312 has been extended relative to housing 302. Charge forming finger 312 is subset 1002 of plurality of charge forming fingers 304. In this illustrative example, subset 1002 is a physical implementation of number of charge forming fingers 216 of FIG. 2. By extending subset 1002, charge 326 is moved into curvature 1004. Movement of charge forming finger 312 and the other movements in the series of movements are each configured to reduce tension and promote shear in charge 326.

Curvature 1004 is a desired final shape for charge 326. Curvature 1004 is complimentary to surface curvature 330.

In FIGS. 3-10, seven different movements of a series of movements to form curvature 1004 and six different subsets of plurality of charge forming fingers 304 are depicted. However, any desirable quantity of movements can be performed to form curvature 1004 in charge 326. Additionally, any desirable quantity of subsets of plurality of charge forming fingers 304 can be used to form curvature 1004 in charge 326. The illustration of the series of movements in FIGS. 3-10 does not limit the quantity of movements or the quantity of subsets that could be used to form curvature 1004 or any other desirable curvature into a charge.

Additionally, FIGS. 3-10 do not provide any limitations to the speed of movement, transitions between the series of movements, or other features of the series of movements to form curvature 1004. In some cases, movement of two subsets may be executed substantially concurrently, or additional movements not depicted may be implemented, depending upon the deformation involved.

Figure 11:
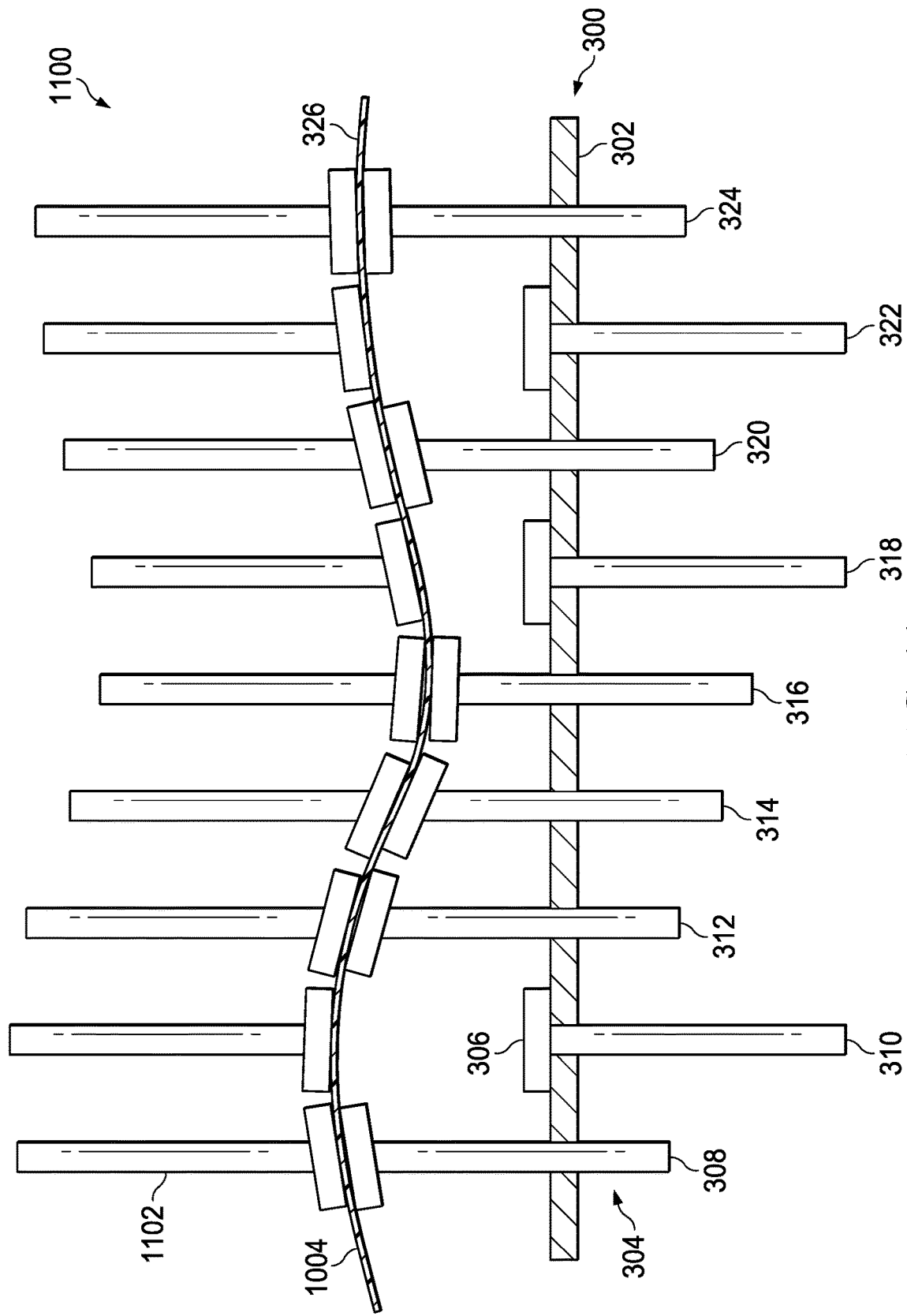
FIG. 11 is an illustration of a cross-sectional view of a charge being removed from a charge forming table in accordance with an illustrative example.

Turning now to FIG. 11, an illustration of a cross-sectional view of a charge being removed from a charge forming table is depicted in accordance with an illustrative embodiment. In view 1100, charge 326 having curvature 1004 is supported by charge support surface 306 while pick and place machine 1102 is placed into contact with charge 326.

Figure 12:
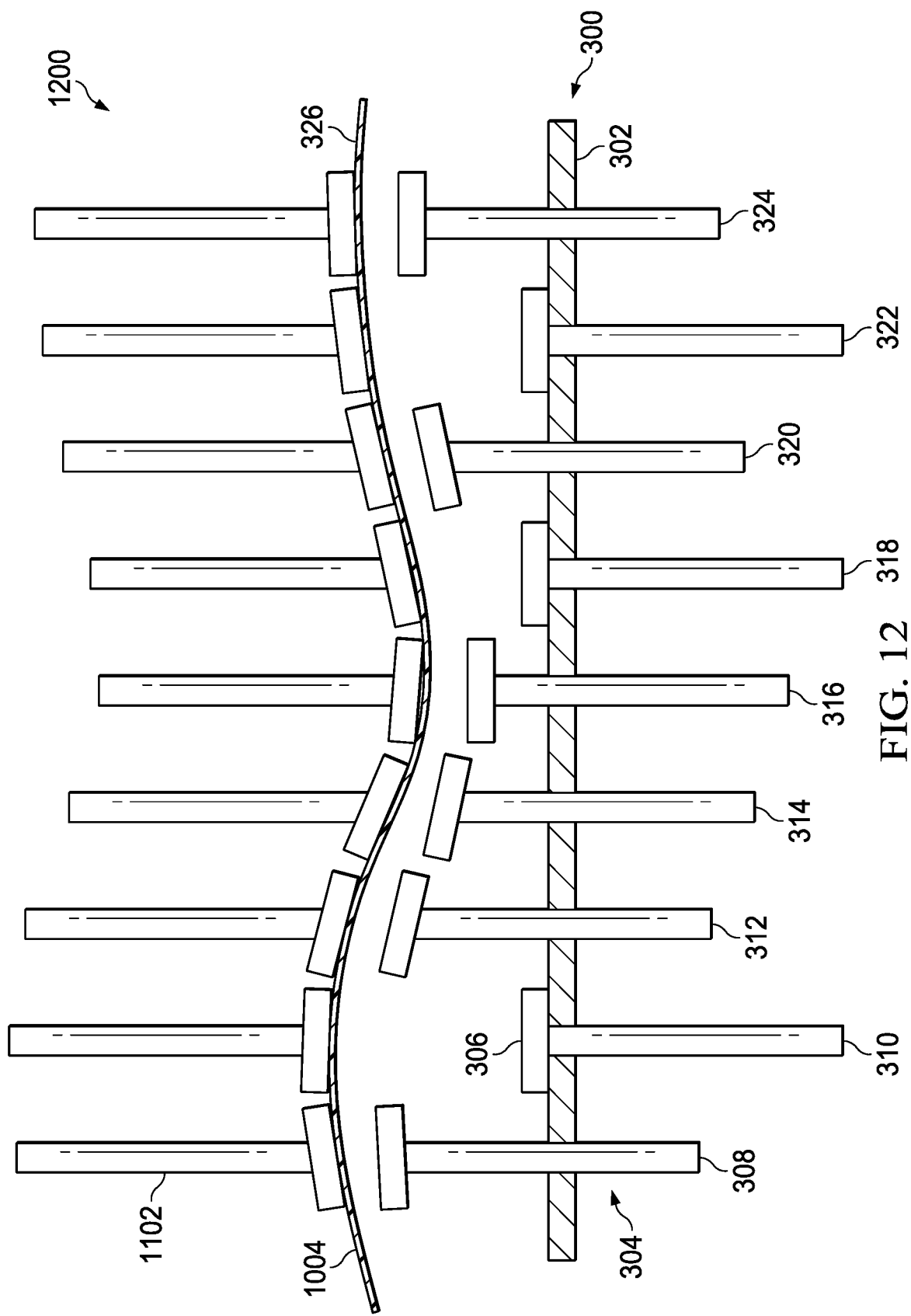
FIG. 12 is an illustration of a cross-sectional view of a charge being removed from a charge forming table in accordance with an illustrative example.

Turning now to FIG. 12, an illustration of a cross-sectional view of a charge being removed from a charge forming table is depicted in accordance with an illustrative embodiment. In view 1200, charge 326 is lifted from charge support surface 306 by pick and place machine 1102. Pick and place machine 1102 takes any desirable form of a pick and place machine capable of maintaining curvature 1004 in charge 326 as pick and place machine 1102 moves charge 326.

Figure 13:
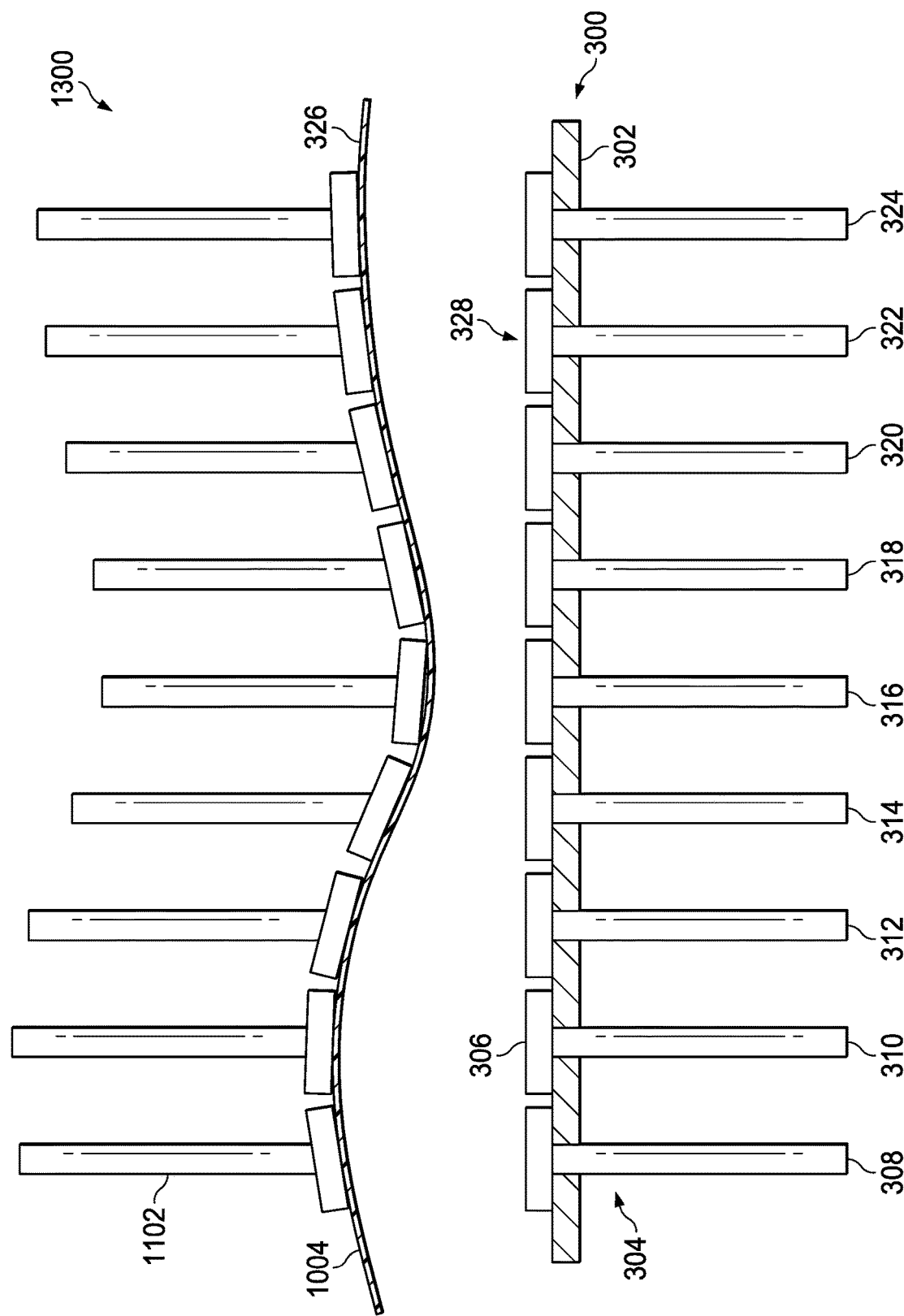
FIG. 13 is an illustration of a cross-sectional view of a charge being removed from a charge forming table in accordance with an illustrative example.

Turning now to FIG. 13, an illustration of a cross-sectional view of a charge being removed from a charge forming table is depicted in accordance with an illustrative embodiment. In view 1300, charge 326 is held by pick and place machine 1102. In view 1300 charge support surface 306 has returned to planar orientation 328. Between view 1200 of FIG. 12 and view 1300, plurality of charge forming fingers 304 has been lowered to achieve planar orientation 328.

Figure 14:
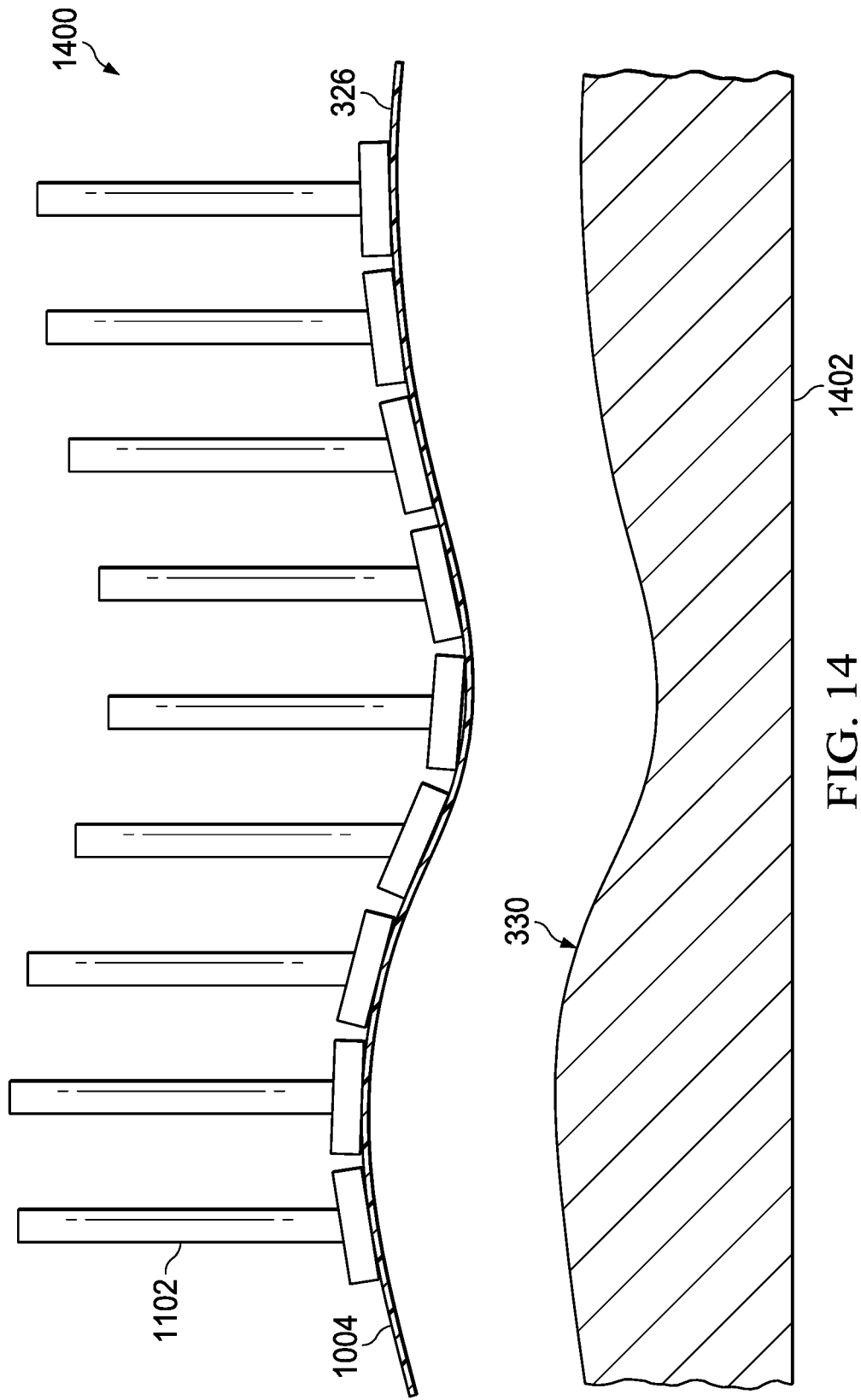
FIG. 14 is an illustration of a cross-sectional view of a charge positioned over a tool in accordance with an illustrative example.

Turning now to FIG. 14, an illustration of a cross-sectional view of a charge positioned over a tool is depicted in accordance with an illustrative embodiment. In view 1400, pick and place machine 1102 has transported charge 326. In view 1400, pick and place machine 1102 holds charge 326 over tool 1402 having surface curvature 330.

Figure 15:
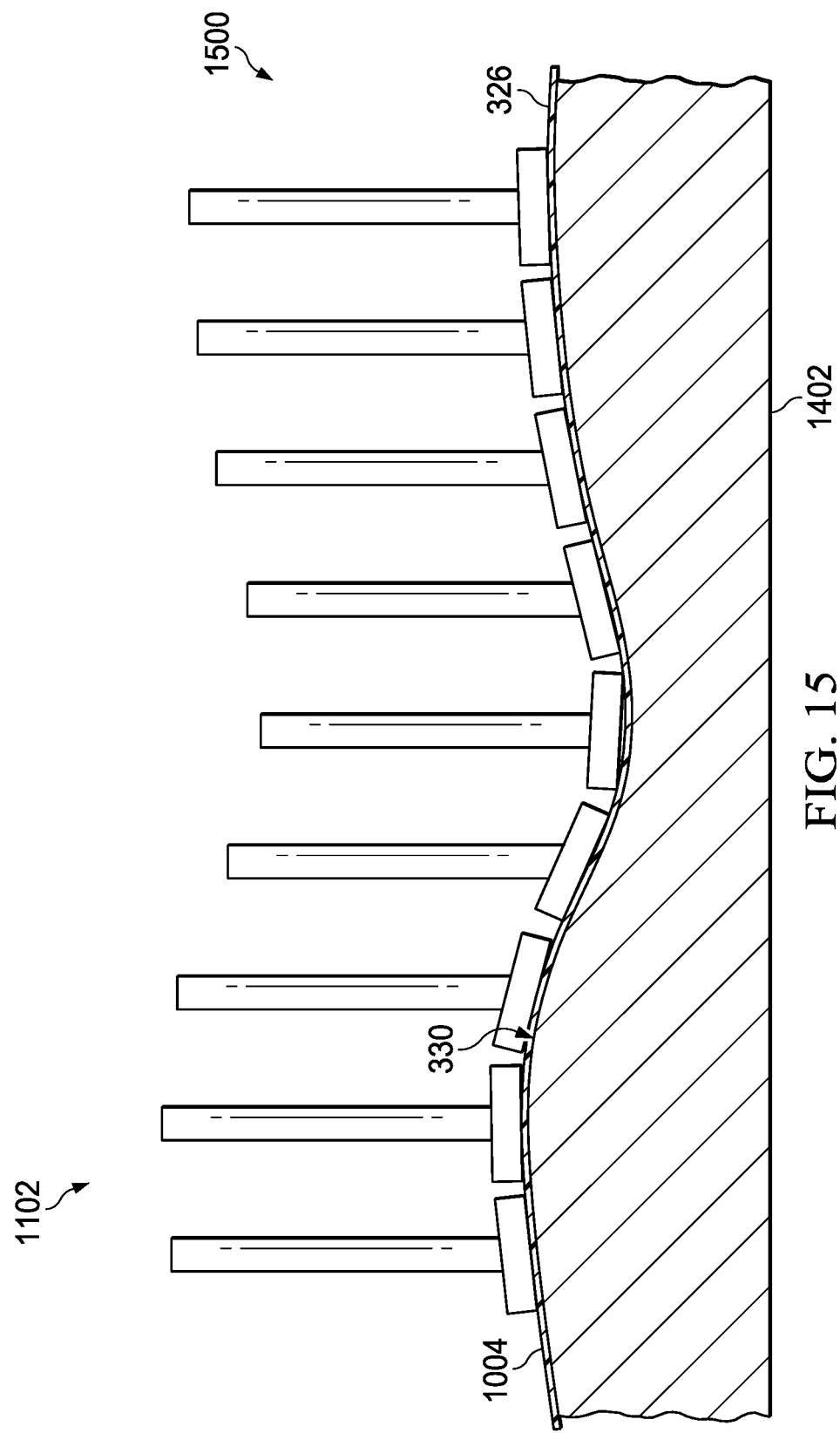
FIG. 15 is an illustration of a cross-sectional view of a charge positioned on a tool in accordance with an illustrative example.

Turning now to FIG. 15, an illustration of a cross-sectional view of a charge positioned on a tool is depicted in accordance with an illustrative embodiment. In view 1500 pick and place machine 1102 has lowered charge 326 such that charge 326 is in contact with surface curvature 330 of tool 1402.

FIGS. 3-15 provide one non-limiting example of a charge being formed and removed from a charge forming table. In other non-depicted illustrative examples, a pick and place machine, such as pick and place machine 1102, can contact charge 326 prior to forming curvature 1004. In some non-depicted examples, a pick and place machine is placed in contact with charge 326 when charge 326 is planar. In one non-depicted example, a pick-and-place machine is placed in contact with charge 326 when charge forming table 300 is in planar orientation 328. In other non-depicted examples, a pick and place machine is placed in contact with charge 326 when charge 326 has an intermediate curvature. For example, a pick and place machine can be placed in contact with charge 326 at an intermediate curvature in any of FIGS. 4-9 or at an intermediate curvature of charge 326 between any of FIGS. 3-10 that is not depicted.

In some illustrative examples, pick and place machine 1102 sandwiches charge 326 between charge support surface 306 of charge forming table 300 and pick and place machine 1102. In some of these illustrative examples, adhesion of charge forming table 300 can be reduced or eliminated. In some of these illustrative examples, charge support surface 306 of charge forming table 300 changes the curvature of charge 326 by moving respective charge forming fingers of plurality of charge forming fingers 304 towards pick and place machine 1102. In some of these illustrative examples, the plurality of charge forming fingers 304 press themselves against pick and place machine 1102 while components of pick and place machine 1102 passively move wherever a charge forming finger of plurality of charge forming fingers 304 moves. In some illustrative examples, plurality of charge forming fingers 304 apply positive pressure against charge 326. In some illustrative examples, positive pressure applied by plurality of charge forming fingers 304 to charge 326 between charge forming table 300 and a pick and place machine can partially or completely replace an adhesion type, such as vacuum.

Figure 16:
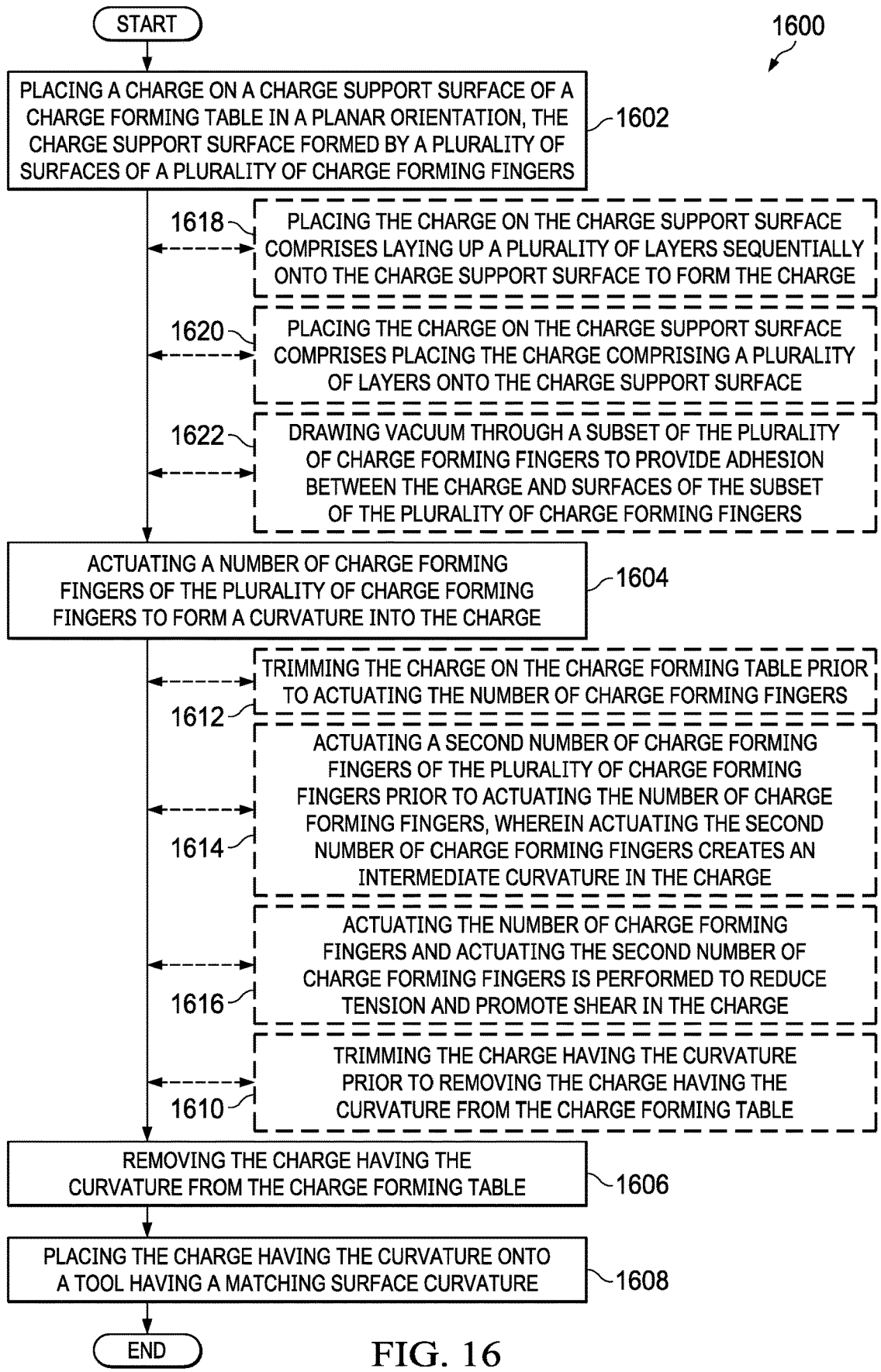
FIG. 16 is a flowchart of a method of forming a composite structure in accordance with an illustrative example.

Turning now to FIG. 16, a flowchart of a method of forming a composite structure is depicted in accordance with an illustrative example. Method 1600 can be used to form a composite structure having charges, such as one of charge 108, charge 110, or charge 112 of FIG. 1. Method 1600 can be used to form a composite structure, such as composite structure 270 of FIG. 2. Method 1600 can use charge forming table 200 of FIG. 2. Method 1600 can be performed using charge forming table 300 of FIGS. 3-13. Method 1600 can be performed on charge 326 of FIGS. 3-15. Method 1600 can be performed using tool 1402 of FIGS. 14-15.

Method 1600 places a charge on a charge support surface of a charge forming table in a planar orientation, the charge support surface formed by a plurality of surfaces of a plurality of charge forming fingers (operation 1602). Method 1600 actuates a number of charge forming fingers of the plurality of charge forming fingers to form a curvature into the charge (operation 1604). Method 1600 removes the charge having the curvature from the charge forming table (operation 1606). Method 1600 places the charge having the curvature onto a tool having a matching surface curvature (operation 1608). Afterwards, method 1600 terminates.

In some illustrative examples, method 1600 trims the charge having the curvature prior to removing the charge having the curvature from the charge forming table (operation 1610). In these illustrative examples, the charge forming table is a cutting table. In these illustrative examples, a cutter that can be moved in three-dimensional space is used to trim the charge having the curvature. By trimming the charge having the curvature, a number of edges are trimmed to have desired shapes for accurately placed ply boundaries in the composite structure.

In some illustrative examples, method 1600 trims the charge on the charge forming table prior to actuating the number of charge forming fingers (operation 1612). In some of these illustrative examples, the charge is trimmed when the charge is planar. In some of these illustrative examples, the charge is trimmed when the charge has an intermediate curvature.

In some illustrative examples, method 1600 actuates a second number of charge forming fingers of the plurality of charge forming fingers prior to actuating the number of charge forming fingers, wherein actuating the second number of charge forming fingers creates an intermediate curvature in the charge (operation 1614). In some illustrative examples, the second number of charge forming fingers has at least one charge forming finger in common with the first number of charge forming fingers. In some illustrative examples, the second number of charge forming fingers and the number of charge forming fingers have no charge forming fingers in common.

In some illustrative examples, actuating the number of charge forming fingers and actuating the second number of charge forming fingers is performed to reduce tension and promote shear in the charge (operation 1616). In these illustrative examples, the movement of number of charge forming fingers and the second number of charge forming fingers is performed based on material properties of the charge.

In some illustrative examples, placing the charge on the charge support surface comprises laying up a plurality of layers sequentially onto the charge support surface to form the charge (operation 1618). In some illustrative examples, placing the charge on the charge support surface comprises placing the charge comprising a plurality of layers onto the charge support surface (operation 1620).

The charge is maintained on the charge support surface using any desirable type of adhesion. The charge support surface comprises at least one of vacuum, electro-static, or physical adhesive. In some illustrative examples, method 1600 draws vacuum through a subset of the plurality of charge forming fingers to provide adhesion between the charge and surfaces of the subset of the plurality of charge forming fingers (operation 1622).

Figure 17:
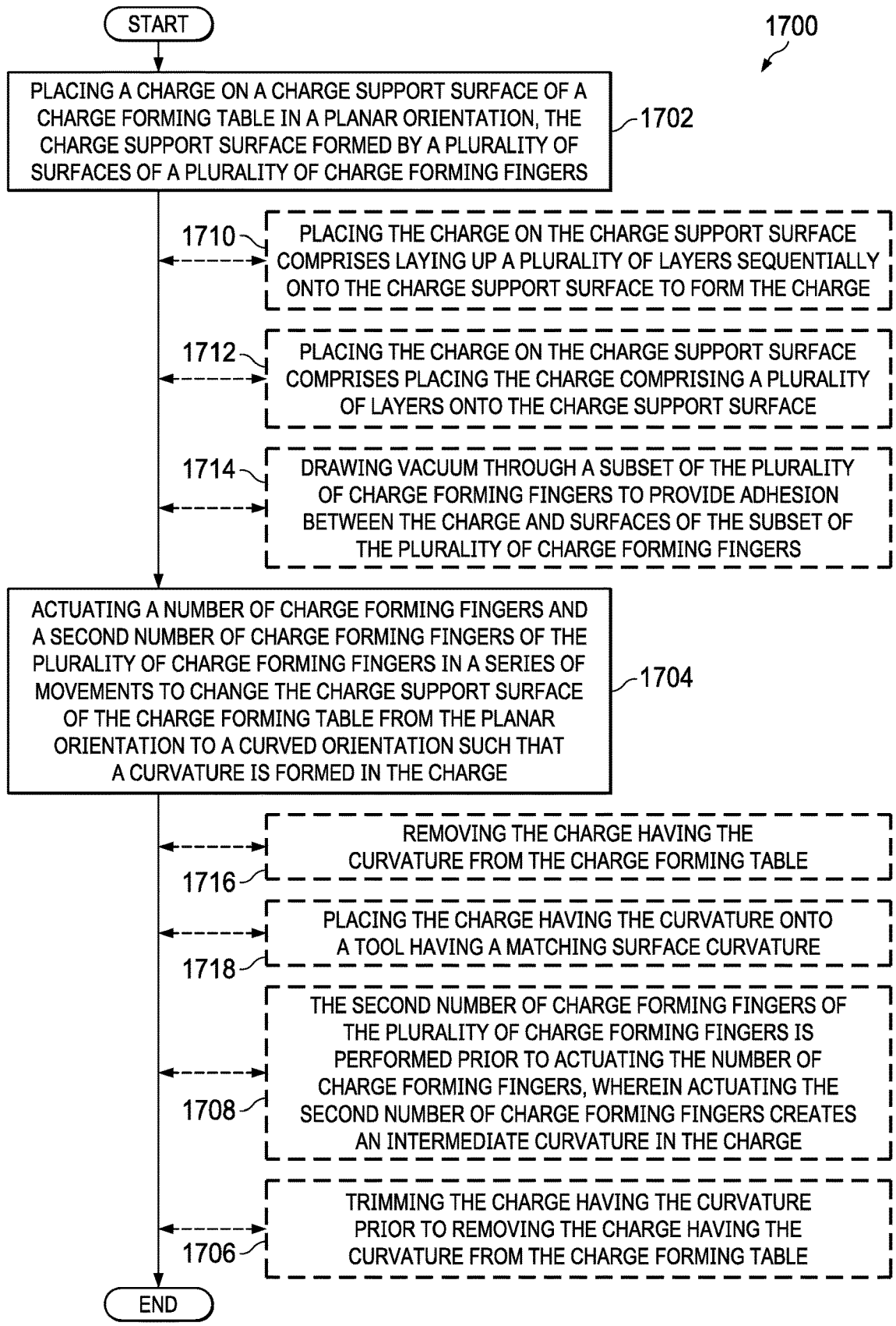
FIG. 17 is a flowchart of a method of forming a composite structure in accordance with an illustrative example.

Turning now to FIG. 17, a flowchart of a method of forming a composite structure is depicted in accordance with an illustrative example. Method 1700 can be used to form a composite structure having charges, such as one of charge 108, charge 110, or charge 112 of FIG. 1. Method 1700 can be used to form a composite structure, such as composite structure 270 of FIG. 2. Method 1700 can use charge forming table 200 of FIG. 2. Method 1700 can be performed using charge forming table 300 of FIGS. 3-13. Method 1700 can be performed on charge 326 of FIGS. 3-15.

Method 1700 places a charge on a charge support surface of a charge forming table in a planar orientation, the charge support surface formed by a plurality of surfaces of a plurality of charge forming fingers (operation 1702). Method 1700 actuates a number of charge forming fingers and a second number of charge forming fingers of the plurality of charge forming fingers in a series of movements to change the charge support surface of the charge forming table from the planar orientation to a curved orientation such that a curvature is formed in the charge (operation 1704). Afterwards, method 1700 terminates.

In some illustrative examples, method 1700 trims the charge having the curvature prior to removing the charge having the curvature from the charge forming table (operation 1706).

In some illustrative examples, the second number of charge forming fingers of the plurality of charge forming fingers is performed prior to actuating the number of charge forming fingers, wherein actuating the second number of charge forming fingers creates an intermediate curvature in the charge (operation 1708).

In some illustrative examples, method 1700 places the charge on the charge support surface comprises laying up a plurality of layers sequentially onto the charge support surface to form the charge (operation 1710). The plurality of layers can be laid up using any desirable equipment, such as tape laying equipment, tow laying equipment, or fabric placement equipment.

In some illustrative examples, method 1700 places the charge on the charge support surface comprises placing the charge comprising a plurality of layers onto the charge support surface (operation 1712). In these illustrative examples, the charge is laid up on another tool and moved to the charge support surface.

In some illustrative examples, the charge is maintained on the charge support surface using any desirable type of adhesion. In some illustrative examples, the charge support surface comprises at least one of vacuum, electro-static, or physical adhesive. In some illustrative examples, the plurality of charge forming fingers apply a positive pressure against the charge sandwiched between the plurality of charge forming fingers and a pick and place machine. In some illustrative examples, method 1700 draws vacuum through a subset of the plurality of charge forming fingers to provide adhesion between the charge and surfaces of the subset of the plurality of charge forming fingers (operation 1714).

In some illustrative examples, method 1700 removes the charge having the curvature from the charge forming table (operation 1716); and places the charge having the curvature onto a tool having a matching surface curvature (operation 1718). When the charge is placed onto the tool near another charge, the charge is placed to form an accurate ply boundary.

Figure 18:
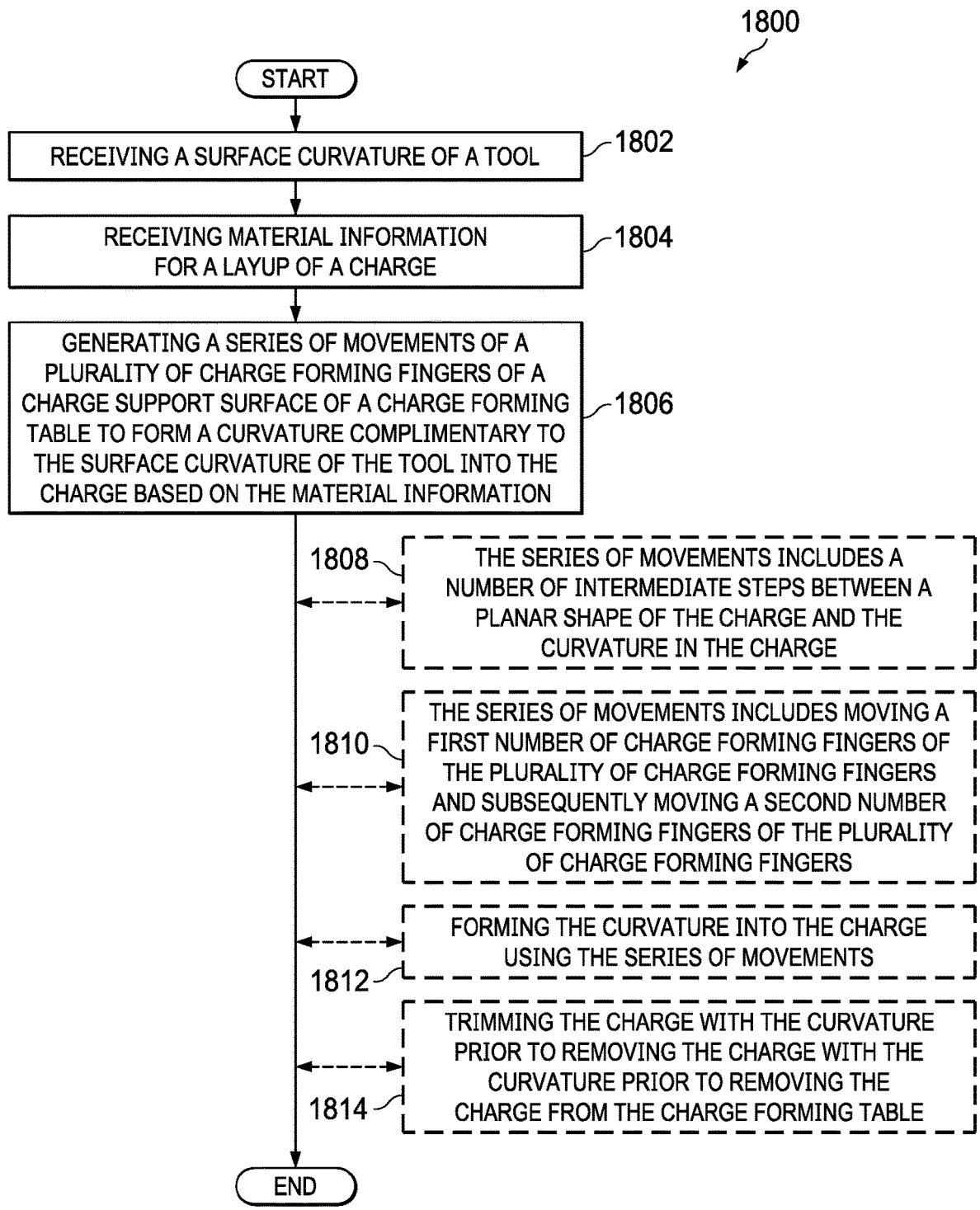
FIG. 18 is a flowchart of a method of forming a composite structure in accordance with an illustrative example.

Turning now to FIG. 18, a flowchart of a method of forming a composite structure is depicted in accordance with an illustrative example. Method 1800 can be used to form a composite structure having charges, such as one of charge 108, charge 110, or charge 112 of FIG. 1. Method 1800 can be used to form a composite structure, such as composite structure 270 of FIG. 2. Method 1800 can use computer system 274 of FIG. 2. Method 1800 can be performed using charge forming table 300 of FIGS. 3-13. Method 1800 can be performed on charge 326 of FIGS. 3-15.

Method 1800 receives a surface curvature of a tool (operation 1802). Method 1800 receives material information for a layup of a charge (operation 1804). The material information includes types of fibers in the charge, types of resin in the charge (if present), directions of fibers in the charge, shapes of plurality of layers of the charge, and an order (layup) of the plurality of layers in the charge.

Method 1800 generates a series of movements of a plurality of charge forming fingers of a charge support surface of a charge forming table to form a curvature complimentary to the surface curvature of the tool into the charge based on the material information (operation 1806). By generating the series of movements based on the material information, method 1800 generates the series of movements that maintains desired levels of tension and shear in the charge. Afterwards, method 1800 terminates.

In some illustrative examples, the series of movements includes a number of intermediate steps between a planar shape of the charge and the curvature in the charge (operation 1808). In some illustrative examples, the series of movements includes moving a second number of charge forming fingers of the plurality of charge forming fingers and subsequently moving a number of charge forming fingers of the plurality of charge forming fingers (operation 1810). Although only the number of charge forming fingers and second number of charge forming fingers are discussed, any desirable quantity of subsets of charge forming fingers are moved to form the curvature into the charge incrementally.

In some illustrative examples, method 1800 forms the curvature into the charge using the series of movements (operation 1812). In some illustrative examples, method 1800 trims the charge with the curvature prior to removing the charge with the curvature prior to removing the charge from the charge forming table (operation 1814).

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 1610 through operation 1622 of FIG. 16 may be optional. As another example, any of operation 1706 through operation 1718 of FIG. 17 may be optional. As yet another example, any of operation 1808 through operation 1814 of FIG. 18 may be optional.

Figure 19:
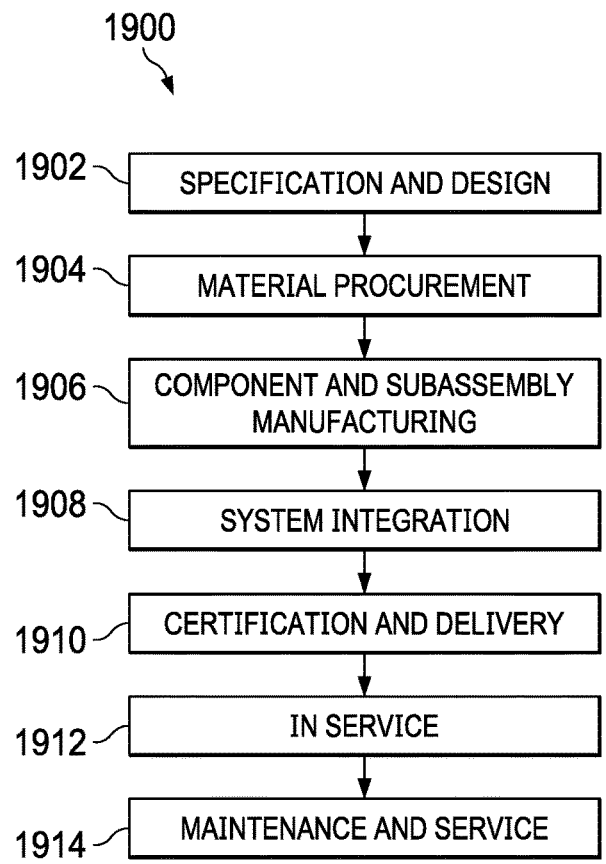
FIG. 19 is an illustration of an aircraft manufacturing and service method in a form of a block diagram in accordance with an illustrative example.
Figure 20:
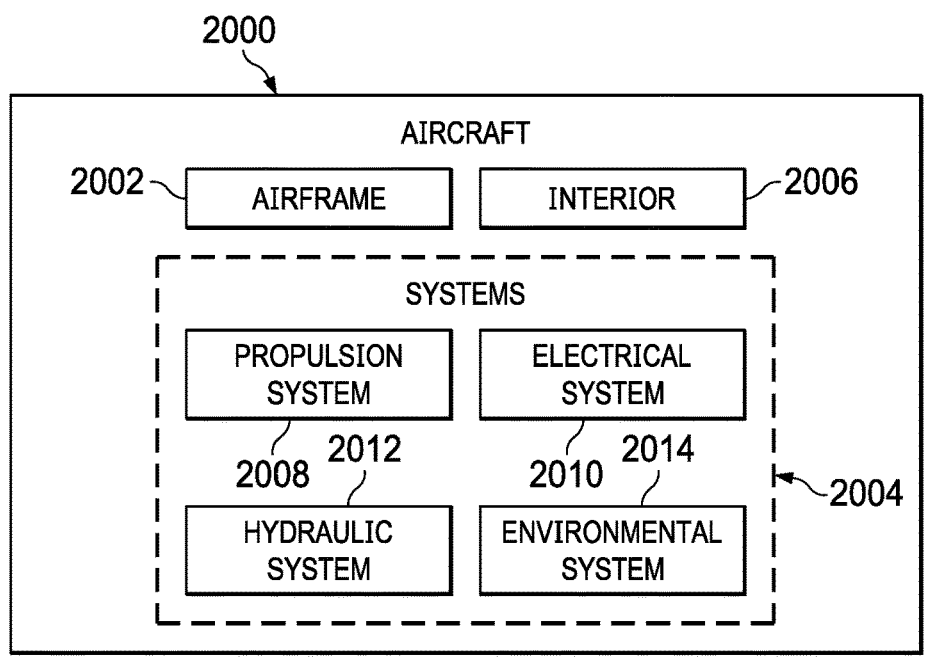
FIG. 20 is an illustration of an aircraft in a form of a block diagram in which an illustrative example may be implemented.

Illustrative examples of the present disclosure may be described in the context of aircraft manufacturing and service method 1900 as shown in FIG. 19 and aircraft 2000 as shown in FIG. 20. Turning first to FIG. 19, an illustration of an aircraft manufacturing and service method in a form of a block diagram is depicted in accordance with an illustrative example. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 takes place. Thereafter, aircraft 2000 may go through certification and delivery 1910 in order to be placed in service 1912. While in service 1912 by a customer, aircraft 2000 is scheduled for routine maintenance and service 1914, which may include modification, reconfiguration, refurbishment, or other maintenance and service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft in a form of a block diagram is depicted in which an illustrative example may be implemented. In this example, aircraft 2000 is produced by aircraft manufacturing and service method 1900 of FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included.

Apparatuses and methods embodied herein may be employed during at least one of the stages of aircraft manufacturing and service method 1900. One or more illustrative examples may be manufactured or used during at least one of component and subassembly manufacturing 1906, or maintenance and service 1914 of FIG. 19. For example, charge forming table 200 of FIG. 2 can be used during component and subassembly manufacturing 1906 or maintenance and service 1914 of aircraft manufacturing and service method 1900 of FIG. 19. Curvature 204 can be formed in charge 206 of FIG. 2 during component and subassembly manufacturing 1906 or maintenance and service 1914 of aircraft manufacturing and service method 1900 of FIG. 19. Charge forming table 300 of FIGS. 3-13 can be used during component and subassembly manufacturing 1906 or maintenance and service 1914 of aircraft manufacturing and service method 1900 of FIG. 19. Charge forming table 200 of FIG. 2 can be used to form portions of airframe 2002 or interior 2006 of aircraft 2000.

The illustrative examples present methods and a charge forming table for forming a curvature into a charge. The methods and charge forming table can be used for dry fiber preforms or prepreg composite preforms. The illustrative examples present methods and a charge forming table that enable use of 3D PnP for forming a composite structure. The illustrative examples provide for deforming a fabric on the charge forming table through actuated regions that pop up whilst the fabric is adhered to it. In some illustrative examples, once deformed, the charge is then cut using a numerically controlled cutter. The cutter can operate in 3 degrees of freedom (x, y, z).

By deforming the charge prior to placement on the tool, the illustrative examples place the charge while reducing or preventing inconsistencies, such as wrinkles, during the actual 'place' stage of the operation. Inconsistencies, such as wrinkles, are reduced or prevented as there is little to no friction being introduced from the tool surface/charge during the draping of the charge.

Another advantage of using an actuated charge forming table is that, unlike end effectors, the charge forming table is not weight limited. As the actuation services are mounted on the ground, the charge forming table is not as weight limited compared to a robot arm/crane/gantry. This additional allowance for weight enables the charge forming table to have far more actuation points to deform the charge more uniformly. Increasing a number of actuated charge forming fingers provides better deformation resolution when compared to providing limited discrete zones of actuation.

The illustrative examples provide for deforming the charge prior to placement on a curved tool. Deforming the charge prior to placement on a curved tool allows the charge to be over deformed allowing for potential relaxation. Deforming the charge prior to placement on a curved tool enables cutting of the ply boundaries after deformation. Allowing for potential relaxation and enabling cutting of the ply boundaries after relaxation can provide accurate edge definitions upon placement. Some of the illustrative examples avoid manual alignment of the ply boundaries by cutting the boundaries of the charge after they have been deformed. Accurate placement of the ply boundaries overcomes one of the hurdles of going from a manual lay up to an automated activity.

In some illustrative examples, the charge forming table is a cutting table that is actuated. The actuated table facilitates the production operation to be improved for automation processes by deforming the charge prior to placement on the tool. In illustrative examples in which the deformed fabric is cut on the charge forming table, cutting the dry fabric after deformation significantly improves that potential that ply boundaries will line up within the design specification.

The charge forming table is designed to incorporate several zones that can be actuated up and down to a level surface. The z-motion of the plurality of charge forming fingers extends to the range of motion that suits the z-height of the curved tool. This actuated table can be used for multiple tool shapes by programming the actuators to move to their desired z-positions. Actuation of the prongs does not limit the deformation of the dry fabric to take place in a consecutive manner, instead prongs in different locations of the table can be moved to follow a desired deformation strategy optimized to make use of the charges tendency to shear better in certain directions.

The illustrative examples enable automation of the 3D PnP operation of dry fabrics in resin infusion (RI) manufacturing processes. The illustrative examples reduce labor costs through the use of automation. The illustrative examples provide a means of faster layup of structures. The illustrative examples reduce or eliminate potential ergonomic concerns associated with operators laying up large tools/structures. The illustrative examples can also be used with prepreg materials.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite structure, the method comprising:
    placing a charge on a charge support surface of a charge forming table in a planar orientation, the charge support surface formed by a plurality of surfaces of a plurality of charge forming fingers;
    drawing vacuum through a subset of the plurality of charge forming fingers to provide adhesion between the charge and surfaces of the subset of the plurality of charge forming fingers;
    actuating a number of charge forming fingers of the plurality of charge forming fingers to form a curvature into the charge;
    locking each of the number of charge forming fingers of the plurality of charge forming fingers at a respective desired extended length with a plurality of one-way locks;
    removing the charge having the curvature from the charge forming table; and
    placing the charge having the curvature onto a tool having a matching surface curvature.

2. The method of claim 1 further comprising:
    trimming the charge having the curvature prior to removing the charge having the curvature from the charge forming table.

3. The method of claim 1 further comprising:
    trimming the charge on the charge forming table prior to actuating the number of charge forming fingers.

4. The method of claim 1 further comprising:
    actuating a second number of charge forming fingers of the plurality of charge forming fingers prior to actuating the number of charge forming fingers, wherein actuating the second number of charge forming fingers creates an intermediate curvature in the charge.

5. The method of claim 4, wherein actuating the number of charge forming fingers and actuating the second number of charge forming fingers is performed to reduce tension and promote shear in the charge.

6. The method of claim 1, wherein placing the charge on the charge support surface comprises laying up a plurality of layers sequentially onto the charge support surface to form the charge.

7. The method of claim 1, wherein placing the charge on the charge support surface comprises placing the charge comprising a plurality of layers onto the charge support surface.

8. A method of forming a composite structure, the method comprising:
placing a charge on a charge support surface of a charge forming table in a planar orientation, the charge support surface formed by a plurality of surfaces of a plurality of charge forming fingers;
drawing vacuum through a subset of the plurality of charge forming fingers to provide adhesion between the charge and surfaces of the subset of the plurality of charge forming fingers;
actuating a number of charge forming fingers and a second number of charge forming fingers of the plurality of charge forming fingers in a series of movements to change the charge support surface of the charge forming table from the planar orientation to a curved orientation such that a curvature is formed in the charge; and
locking each of the number of charge forming fingers and the second number of charge forming fingers of the plurality of charge forming fingers at a respective desired extended length with a plurality of one-way locks.

9. The method of claim 8 further comprising:
trimming the charge having the curvature prior to removing the charge having the curvature from the charge forming table.

10. The method of claim 8, wherein actuating the second number of charge forming fingers of the plurality of charge forming fingers is performed prior to actuating the number of charge forming fingers, wherein actuating the second number of charge forming fingers creates an intermediate curvature in the charge.

11. The method of claim 8, wherein placing the charge on the charge support surface comprises laying up a plurality of layers sequentially onto the charge support surface to form the charge.

12. The method of claim 8, wherein placing the charge on the charge support surface comprises placing the charge comprising a plurality of layers onto the charge support surface.

13. The method of claim 8 further comprising:
removing the charge having the curvature from the charge forming table; and
placing the charge having the curvature onto a tool having a matching surface curvature.

14. The method of claim 8 further comprising:
applying a physical adhesive to surfaces of another subset of the plurality of charge forming fingers.

15. The method of claim 8, wherein each one of the plurality of one-way locks is associated with a respective one of the number of charge forming fingers and the second number of charge forming fingers of the plurality of charge forming fingers.

16. The method of claim 8, wherein the plurality of one-way locks comprises a plurality of one-way cam locks.

17. The method of claim 8, wherein the plurality of one-way locks comprises a plurality of inclined jam collars.

18. The method of claim 8 further comprising:
trimming the charge on the charge forming table prior to actuating the number of charge forming fingers and the second number of charge forming fingers.

19. The method of claim 8, wherein actuating the number of charge forming fingers and actuating the second number of charge forming fingers is performed to reduce tension and promote shear in the charge.

20. A method of forming a composite structure, the method comprising:
receiving a surface curvature of a tool;
receiving material information for a layup of a charge;
placing the charge on a charge support surface of a charge forming table in a planar orientation;
generating a series of movements of a plurality of charge forming fingers of the charge support surface of the charge forming table to form a curvature complimentary to the surface curvature of the tool into the charge based on the material information;
locking each of the plurality of charge forming fingers of the charge support surface at a respective desired extended length with a plurality of one-way locks; and
adhering the charge to surfaces of a subset of the plurality of charge forming fingers by drawing vacuum through the subset of the plurality of charge forming fingers or by applying an electro-static charge to the subset of the plurality of charge forming fingers.

21. The method of claim 20, wherein the series of movements includes a number of intermediate steps between a planar shape of the charge and the curvature in the charge.

22. The method of claim 20, wherein the series of movements includes moving a second number of charge forming fingers of the plurality of charge forming fingers and subsequently moving a number of charge forming fingers of the plurality of charge forming fingers.

23. The method of claim 20 further comprising:
forming the curvature into the charge using the series of movements; and
trimming the charge with the curvature prior to removing the charge with the curvature from the charge forming table.

24. The method of claim 20 further comprising:
trimming the charge on the charge forming table prior to generating the series of movements of the plurality of charge forming fingers.

25. The method of claim 20 further comprising:
removing the charge having the curvature complimentary to the surface curvature of the tool from the charge forming table; and
placing the charge having the curvature complimentary to the surface curvature of the tool onto the tool.

26. The method of claim 20, wherein placing the charge on the charge support surface comprises laying up a plurality of layers sequentially onto the charge support surface to form the charge.

27. A method of forming a composite structure, the method comprising:
placing a charge on a charge support surface of a charge forming table in a planar orientation, the charge support surface formed by a plurality of surfaces of a plurality of charge forming fingers;
actuating a number of charge forming fingers of the plurality of charge forming fingers to form a curvature into the charge;
locking each of the number of charge forming fingers of the plurality of charge forming fingers at a respective desired extended length with a plurality of one-way locks
removing the charge having the curvature from the charge forming table; and placing the charge having the curvature onto a tool having a matching surface curvature.

* * * * *